United States Patent [19]
Arbeiter

[11] Patent Number: 5,823,058
[45] Date of Patent: Oct. 20, 1998

[54] TWIST-GRIP SHIFTER FOR BICYCLES AND A BICYCLE HAVING A TWIST-GRIP SHIFTER

[75] Inventor: Markus Arbeiter, Würzburg, Germany

[73] Assignee: Mannesmann Sachs AG, Schweinfurt, Germany

[21] Appl. No.: 610,651

[22] Filed: Mar. 4, 1996

Related U.S. Application Data

[63] Continuation-in-part of Ser. No. 566,284, Dec. 1, 1995, Pat. No. 5,666,859, which is a continuation-in-part of Ser. No. 563,996, Nov. 29, 1995, Pat. No. 5,588,925.

[60] Provisional application No. 60/004,006, Sep. 20, 1995.

[30] Foreign Application Priority Data

Dec. 2, 1994 [DE] Germany ............... 44 42 953.3
Dec. 2, 1994 [DE] Germany ............... 44 42 952.5

[51] Int. Cl.⁶ ............... B62K 23/04; B62M 25/04
[52] U.S. Cl. ............... 74/489; 74/473.13; 74/506
[58] Field of Search ............... 74/489, 506, 473.13, 74/473.14

[56] References Cited

U.S. PATENT DOCUMENTS

| | | | |
|---|---|---|---|
| D. 269,850 | 7/1983 | Preisler et al. | D8/303 |
| D. 298,309 | 11/1988 | Coue | D8/303 X |
| D. 299,333 | 1/1989 | Coue | D8/303 X |
| D. 324,634 | 3/1992 | Chen | D8/303 |
| D. 351,776 | 10/1994 | Schuchard et al. | D8/303 |
| 2,862,401 | 12/1958 | Gwin | 74/489 |
| 3,218,879 | 11/1965 | Reed | 74/489 |
| 4,232,565 | 11/1980 | Leonheart | 74/489 |
| 4,352,303 | 10/1982 | Christner | 74/489 |
| 4,686,865 | 8/1987 | Rivera | 74/475 |
| 4,900,291 | 2/1990 | Patterson | 474/80 |
| 4,938,733 | 7/1990 | Patterson | 474/80 |
| 4,945,785 | 8/1990 | Romano | 74/502.2 |
| 5,102,372 | 4/1992 | Patterson et al. | 474/80 |
| 5,134,897 | 8/1992 | Romano | 74/489 |
| 5,197,927 | 3/1993 | Patterson et al. | 474/80 |
| 5,241,877 | 9/1993 | Chen | 74/489 |
| 5,315,891 | 5/1994 | Tagawa | 74/489 |
| 5,390,565 | 2/1995 | Tagawa et al. | 74/489 |
| 5,421,219 | 6/1995 | Tagawa et al. | 74/502.2 |

FOREIGN PATENT DOCUMENTS

| | | |
|---|---|---|
| 0671315 | 9/1995 | European Pat. Off. |
| 1054875 | 10/1953 | France ............... 74/489 |
| 2540818 | 8/1984 | France . |
| 2657062 | 7/1991 | France . |
| 2817627 | 11/1978 | Germany . |
| 3215426 | 10/1983 | Germany . |
| 3215427 | 10/1983 | Germany . |
| 8504060 | 12/1985 | Germany . |
| 3823741 | 1/1989 | Germany . |
| 3727933 | 3/1989 | Germany . |
| 9412207 | 2/1995 | Germany . |
| 29502403 | 6/1995 | Germany . |
| 0180484 | 8/1962 | Sweden . |
| 9318960 | 9/1993 | WIPO . |
| 9318961 | 9/1993 | WIPO . |
| 9319977 | 10/1993 | WIPO . |

OTHER PUBLICATIONS

U. S. applications 08/610657 filed Mar. 1996; Markus Arbeiter.
U. S. applications 08/610620 filed Mar. 1996; Markus Arbeiter.
U. S. applications 08/610665 filed Mar. 1996; Klaus Neu-Mann.

*Primary Examiner*—Allan D. Herrmann
*Attorney, Agent, or Firm*—Nils H. Ljungman and Associates

[57] ABSTRACT

A twist-grip shifter for bicycles having a twist grip or grip part which is actuated by the rider's hand to change the gears of the bicycle, and a cable winding mechanism or coil wind-up mechanism. The twist grip and the cable winding mechanism of the twist-grip shifter can be connected to one another by providing claws or projections on a tubular extension of the cable winding mechanism, and by providing corresponding recesses inside the twist grip, in which recesses the claws can be engaged. One of the claws and one of the recesses can be configured differently from the other claws and recesses, in order to simplify the assembly of the two parts with respect to one another.

18 Claims, 16 Drawing Sheets

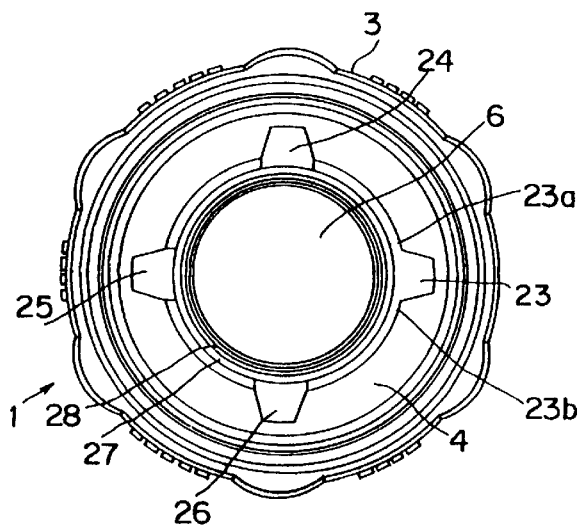
FIG. 9
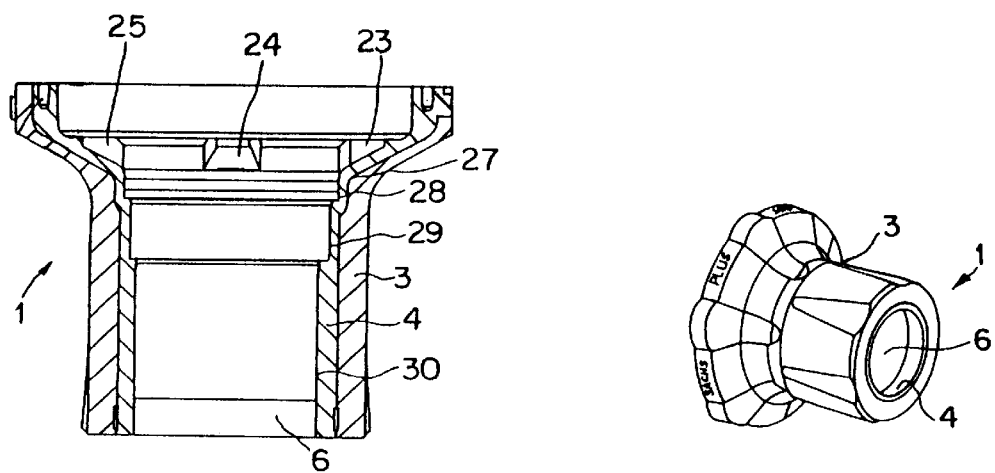
FIG. 10
FIG. 11

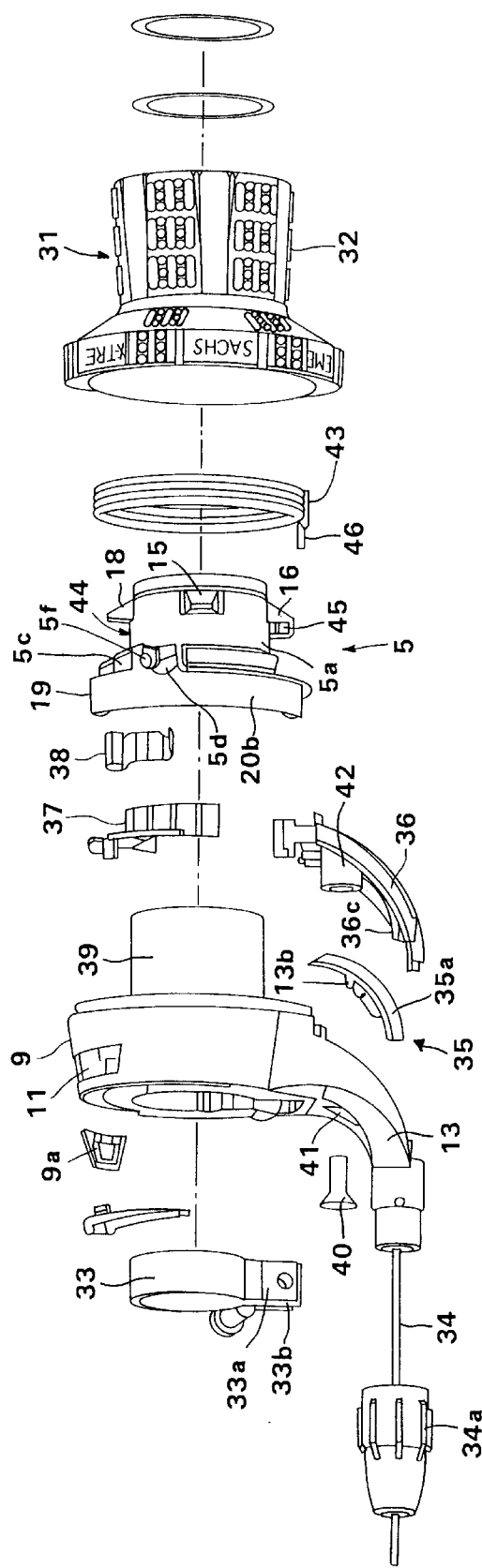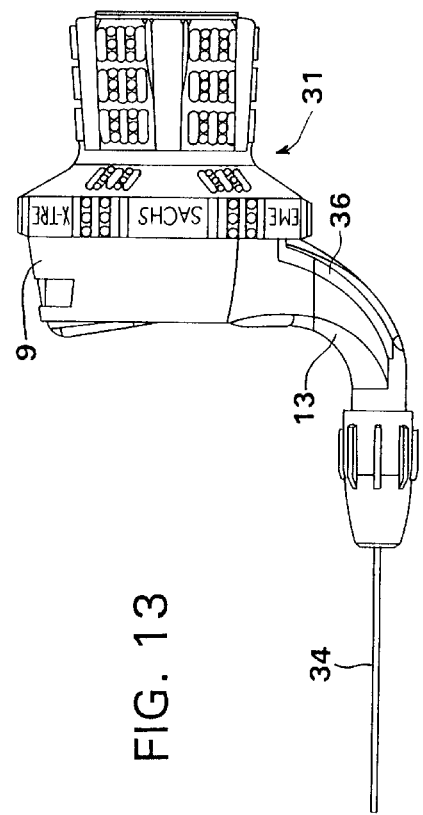
FIG. 12
FIG. 13

5,823,058

TWIST-GRIP SHIFTER FOR BICYCLES AND A BICYCLE HAVING A TWIST-GRIP SHIFTER

CROSS-REFERENCE TO RELATED APPLICATIONS

The present application is a continuation-in-part of U.S. patent application Ser. No. 08/563,996, filed on Nov. 29, 1995 by Markus Arbeiter and Christian Weishaupt, which issued as U.S. Pat. No. 5,588,925 on Dec. 31, 1996, entitled "Shifter for Transmissions on Bicycles", and U.S. patent application Ser. No. 08/566,284, filed on Dec. 1, 1995 by Markus Arbeiter and Klaus Neumann, which issued as U.S. Pat. No. 5,666,859 on Sep. 16, 1997, entitled "Latching Shifter for a Bicycle Transmission" and U.S. provisional application Ser. No. 60/004,006 filed on Sep. 20, 1995.

BACKGROUND OF THE INVENTION

1. Field of the Invention

The present invention generally relates to a twist-grip shifter for bicycles, which twist-grip shifter can include a twist grip which is actuated by the rider's hand to change the gears of the bicycle, and a cable winding mechanism or winding drum. The present invention particularly relates to the connection between the twist grip and the cable winding mechanism of the twist-grip shifter.

2. Background Information

A twist-grip shifter can typically be located on the handlebar of a bicycle. The type of twist-grip shifter to which the present invention relates is utilized by the rider to change gears of the transmission of the bicycle, in order to adjust for varying riding surface conditions, such as the grade and evenness of the riding surface. The twist-grip shifter can be disposed adjacent the part of the handlebar which the rider typically grips, such as a hand grip, so that the rider can, by movement of the index finger and thumb, shift the gears of the bicycle transmission without a major movement of the hand and/or arm, which movement could result in loss of control of the bicycle.

One type of shifting mechanism which is located directly on the handlebar of a bicycle is disclosed in U.S. Pat. No. 4,938,733. This shifting mechanism includes front and rear shift actuators which include a cup-shaped cam member arranged coaxially with respect to the handlebar end portions. The cam member nests within a complementary cam cover member. After the cam member is assembled within the cam cover member, a cover bushing is mounted on one end of the cover member. The cover member, which cover member is the outermost part of the assembly, can be actuated by the rider's hand in order to change gears. The cam member, cam cover member, and bushing are connected to one another by means of a registration system which permits these components to rotate along with one another.

The cam member rides over a cam pin, which cam pin is fixedly attached to the handlebar end portion, and a shifting cable passes through a bore in the cam pin. By means of the cam member and cam pin, the rotational movement of the cam cover is utilized to move the shifting cable, which shifting cable then communicates with a derailleur mechanism located near the wheel of the bicycle.

The present invention, however, includes a twist grip with an outer part and an inner part, the inner part of which is rigid and can be connected to a cable winding mechanism for activating a control cable. The outer part is rotated by the rider when a gear change is desired, so the outer part and the inner part of the twist grip rotate along with one another, and the inner part transmits the torque applied by the rider to the outer part to the cable winding mechanism. Thus, there is a need for a reliable and economical connection between the cable winding mechanism or cable activating mechanism and the twist grip rotated by the rider.

OBJECT OF THE INVENTION

An object of the present invention is to create a simple and economical non-rotational connection between the grip part of a twist-grip shifter and a cable winding mechanism of a twist-grip shifter.

SUMMARY OF THE INVENTION

Generally, a twist grip shifter in accordance with the present invention is typically located immediately adjacent a fixed hand grip on a handlebar of a bicycle. The fixed hand grip is typically located near the end of the handlebar, but can be located at other places along the handlebar depending on the particular curvature of the handlebar in question. The fixed hand grip is typically gripped by the rider's hand in order to steer and therefore control the movement of the bicycle. The fixed hand grip and the twist-grip shifter can be connected to one another, or at least can be disposed immediately adjacent one another.

The twist grip of the twist-grip shifter in accordance with the present invention can include an outer grip part and an inner twist part, or an exterior portion and an interior portion, which inner twist part can be located within the outer grip part. The inner twist part can be rigid in construction, and can be connected to a cable winding mechanism or winding drum of the twist-grip shifter. Thus, the rider shifts gears by gripping the outer grip part located adjacent the fixed hand grip, and rotating the outer grip part until the desired gear setting is achieved. A rigid, non-rotational connection between the cable winding mechanism and the twist grip is therefore highly desirable, since the twisting force applied by the rider's hand must be transmitted to the cable winding mechanism via the twist grip. Thus, there is a need for a reliable and economical connection between the cable winding mechanism and the twist grip of the twist-grip shifter.

More specifically, the present invention teaches that the above object can be achieved by providing what can be considered to be a "snap" connection between the grip part and the cable winding mechanism of the twist-grip shifter. This connection can be accomplished by providing claws or projections on a tubular extension of the cable winding mechanism or coil wind-up mechanism, which claws can engage in corresponding recesses located in the interior of the grip part. There can also preferably be a circular bead or flange on the tubular extension, adjacent the claws. This circular bead can engage or be guided within a corresponding circular groove located within the interior of the grip part, adjacent the recesses mentioned above.

In accordance with one preferred embodiment of the present invention, there can be four of the aforementioned claws located on the tubular extension of the cable winding mechanism, and four corresponding recesses located inside the grip part. However, a lesser or greater number of claws would be within the scope of the present invention, provided that the number of claws is sufficient for ensuring adequate torque transfer. Further, one of the claws can be configured somewhat differently than the other three claws, and, similarly, one of the recesses inside the grip part can be configured differently than the other three recesses, in order to essentially guarantee a correct assembly of the two parts with respect to one another. Thus, an essentially simple and reliable connection can be achieved between the grip part of a twist-grip shifter and the cable winding mechanism of a twist-grip shifter, which connection can be configured such that an incorrect installation of the two parts with respect to one another can be avoided.

One aspect of the invention resides broadly in a bicycle, the bicycle comprising: a frame; at least two wheels, the at least two wheels comprising at least a front wheel and a rear wheel; the at least two wheels being disposed on the frame; apparatus for propelling at least one of the front wheel and the rear wheel; the apparatus for propelling comprising: a chain; at least two sprockets to engage the chain; at least two pedals, the at least two pedals being connected to one of the at least two sprockets; a seat, the seat being disposed on the frame; a handlebar for steering the bicycle; a bicycle gearing system, the bicycle gearing system comprising: apparatus for shifting gearing associated with the rear wheel of the bicycle; shift actuator apparatus rotatably mounted on the handlebar, generally coaxially with the handlebar; at least one control cable having a first end and a second end; the first end of the at least one control cable being operatively associated with the shift actuator apparatus; the second end of the at least one control cable being operatively associated with the apparatus for shifting gearing; the shift actuator apparatus comprising: a first part for being rotated in a first direction and a second direction; the first part being operatively connected to the apparatus for shifting gearing; the first part comprising a rotatable grip part; a second part, the second part comprising apparatus for actuating the first end of the at least one control cable; apparatus for connecting the first part and the second part to one another, and for rotating the first part and the second part along with one another; a housing, at least a portion of the second part being disposed within the housing.

Another aspect of the invention resides broadly in a handlebar mountable bicycle gear shifter, the gear shifter comprising: shift actuator apparatus rotatably mounted on a handlebar, generally coaxially with the handlebar; at least one control cable having a first end and a second end; the first end of the at least one control cable being operatively associated with the shift actuator apparatus; the second end of the at least one control cable for being operatively associated with gearing; the shift actuator apparatus comprising: a first part for being rotated in a first direction and a second direction; the first part being operatively connected to the gearing; the first part comprising a rotatable grip part; a second part, the second part comprising apparatus for actuating the first end of the at least one control cable; apparatus for connecting the first part and the second part to one another, and for rotating the first part and the second part along with one another; a housing, at least a portion of the second part being disposed within the housing.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is described in greater detail below with reference to the accompanying drawings, in which:

FIG. 9 shows an end view of the twist grip of the twist-grip shifter shown in FIG. 1;

FIG. 10 shows a cross-section of the twist grip shown in FIG. 1;

FIG. 11 shows an additional perspective view of the twist grip shown in FIG. 1;

FIG. 12 shows an exploded view of a complete twist-grip shifter;

FIG. 13 shows the twist-grip shifter of FIG. 12 fully assembled;

DESCRIPTION OF THE PREFERRED EMBODIMENTS

Figure 1:
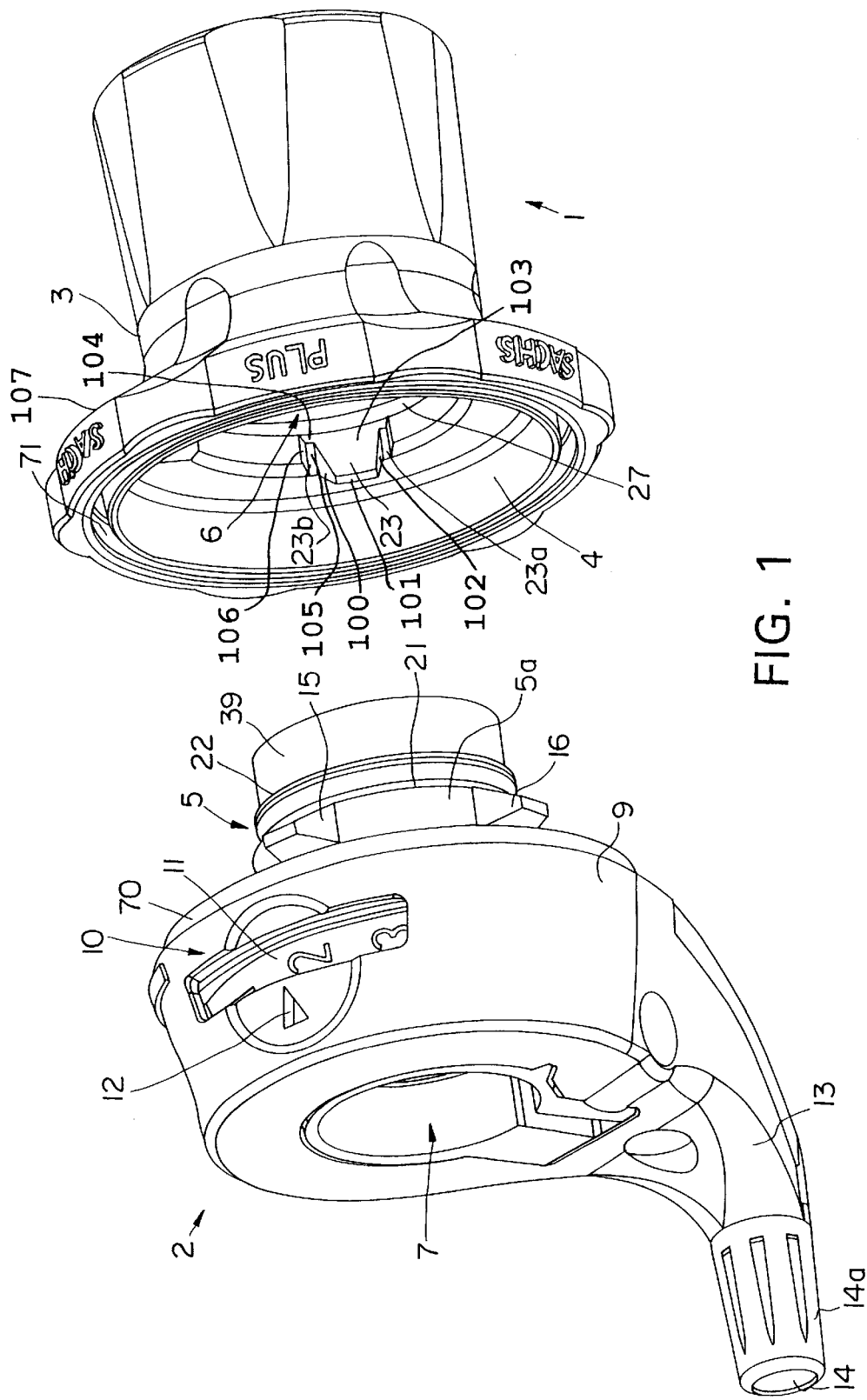
FIG. 1 shows an exploded view of a twist grip and a cable winding mechanism of a twist-grip shifter.
Figure 14:
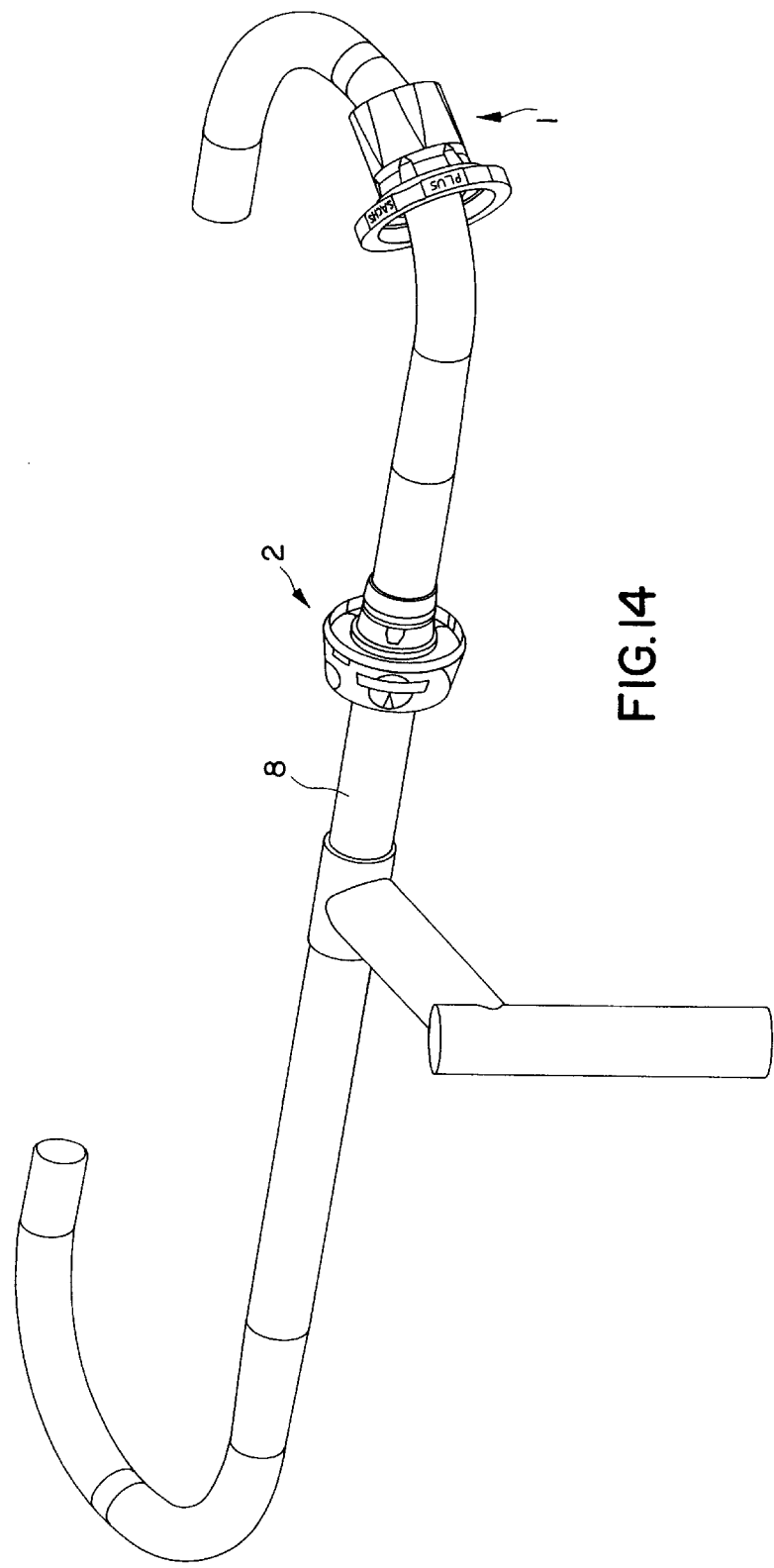
FIG. 14 shows the twist grip shifter of FIG. 1 being assembled on a handlebar of a bicycle.

FIG. 1 shows an exploded view of a twist-grip shifter including a twist grip or grip part 1 and a cable winding portion 2, which cable winding portion 2 houses a cable winding mechanism or winding drum 5. The twist grip 1 can preferably have an exterior portion or grip part 3 which the rider can grip to shift the gears of the bicycle transmission, and an interior portion or twist part 4, which interior portion 4 can be configured for accommodating a tubular extension 5a of the cable winding mechanism 5. Each of the twist grip 1, the cable winding portion 2, and the cable winding mechanism 5, which cable winding mechanism 5 fits inside the cable winding portion 2, can have longitudinal holes 6, 7, and 5b (see FIG. 2), respectively, for accommodating a handlebar 8 (see FIG. 14). The exterior portion 3 of the twist grip 1 can, in accordance with one embodiment, be made of an elastic and/or rubber material, in order to provide a non-slip surface for the fingers and/or hand of the rider.

The exterior portion 3 and the interior portion 4 of the twist grip 1 can be firmly attached to one another, for example by molding, so that the twisting or rotational force applied by the rider to the exterior portion 3 is transmitted to the interior portion 4, in order to shift the gears of the bicycle.

The cable winding portion 2 can preferably include an outer housing 9, which housing 9 houses the cable winding mechanism 5 and other components. The housing 9 can include a shifting indicator 10 with a gear display 11, and an indicator 12, such as an arrow or other marking, so that the rider can visually surmise the current gear of the bicycle transmission. The bicycle transmission, for example, can be a hub transmission or a derailleur transmission such as that shown in FIG. 15. The cable winding portion 2 can also include an arm 13, through which arm 13 a shifting cable (not shown here but see FIGS. 12 and 13) passes by means of a hole 14, and a cable connection or cap 14a. The cable connection 14a can preferably be fastened to the end of arm 13, for example by a threaded connection or other fastening means. The shifting cable can be connected on one end to the cable winding mechanism 5 by threading the cable through a guide 5c (see FIGS. 2, 3 and 4) and then threading the end of the cable through an orifice 5f (see FIG. 3) formed in the guide 5c. The cable can then be held in the orifice 5f by means of a cap 5e (see FIG. 7), which cap 5e can be fixed on the end of the cable, for example by crimping. Thus, the cable can be held in place by means of the cap 5e, which cap 5e can have a larger diameter than the orifice 5f. The orifice 5f can preferably have one end 5d which is flared or wider than the diameter of orifice 5f, in which end 5d the cap 5e can be located. The other end of the cable can then be connected to the transmission of the bicycle.

FIG. 1 shows the grip part 1 and the cable winding portion 2 disassembled from one another in order to illustrate the connection between the two parts. On the tubular extension 5a of the cable winding mechanism 5, there can preferably be four claws or projections 15, 16, 17 and 18, wherein only claws 15 and 16 can be seen in FIG. 1 due to the orientation of the cable winding portion 2. The two remaining claws 17 and 18 are shown in FIGS. 2–4, 7 and 8.

Figure 2:
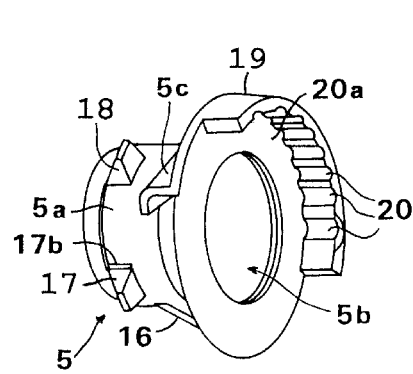
FIG. 2 shows a perspective view of the tubular extension of the cable winding mechanism.
Figure 3:
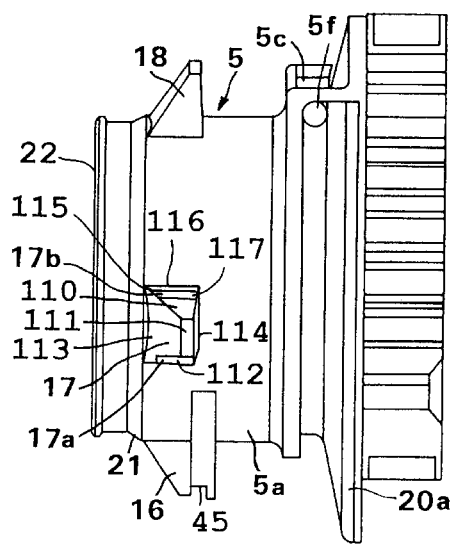
FIG. 3 shows a side view of the tubular extension of the cable winding mechanism.
Figure 4:
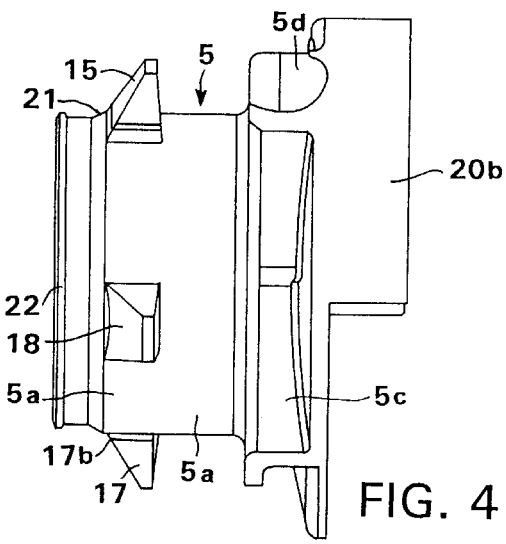
FIG. 4 shows an additional side view of the tubular extension of the cable winding mechanism, rotated by about 45° with respect to the view shown in FIG. 3.
Figure 5:
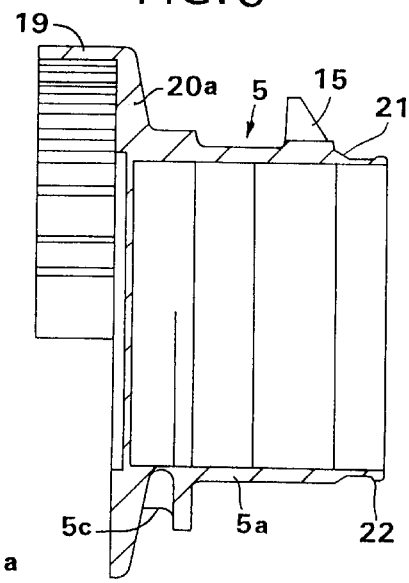
FIG. 5 shows a cross-section of the tubular extension of the cable winding mechanism.
Figure 6:
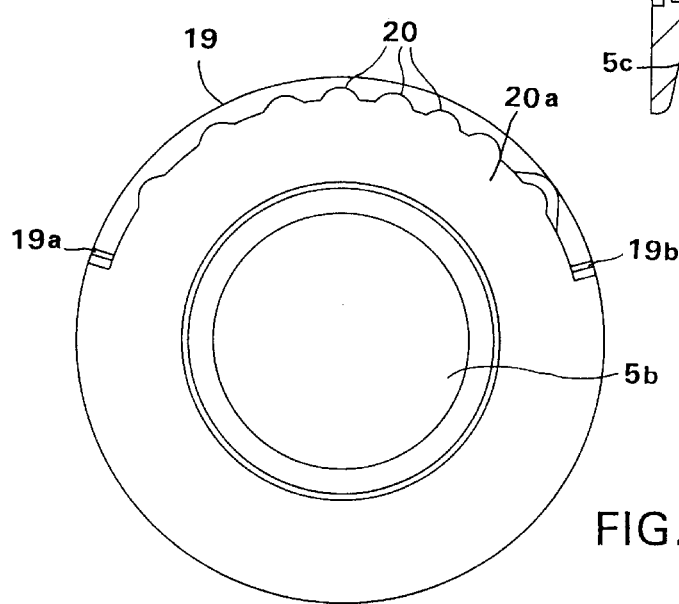
FIG. 6 shows an end view of the tubular extension of the cable winding mechanism.

FIG. 2 shows a perspective view of the tubular extension 5a of the cable winding mechanism 5, FIG. 3 shows a side view of the tubular extension 5a, FIG. 4 shows an additional side view of the tubular extension 5a rotated by about 45° from the view shown in FIG. 3, FIG. 5 shows a cross-section of the tubular extension 5a taken adjacent claw 15, and FIG. 6 shows an end view of the tubular extension 5a.

FIG. 6 also shows a latching element or detent element 19 having detents or notches 20, which latching element 19 is part of the internal shifting mechanism of the twist-grip shifter. The latching element 19 can, in accordance with one embodiment of the present invention, be part of, or integral with, the tubular extension 5a of the cable winding mechanism 5, and a disk portion 20a can serve to connect the latching element 19 and the tubular extension 5a to one another. Of course, latching element 19, tubular extension 5a, and disk portion 20a could also be separate components from one another, and could then be attached to one another by adhesive or other fastening means. The guide 5c discussed immediately above can be disposed on, and can preferably be part of, the disk portion 20a. Further, the side 20b of the latching element 19 which faces outwardly, opposite from the notches 20, can preferably have gear markings, such as numbers, which numbers, when the twist-grip shifter is assembled, can be seen through the gear display 11 (see FIG. 1). In addition, located at each of the two ends of the latching element 19, there can also be projections or stops 19a and 19b (see FIGS. 6 and 8), which stops 19a and 19b can serve to limit the rotation of the cable winding mechanism 5 within the housing 9, by interacting with corresponding stops inside the housing 9 (not shown).

Figure 7:
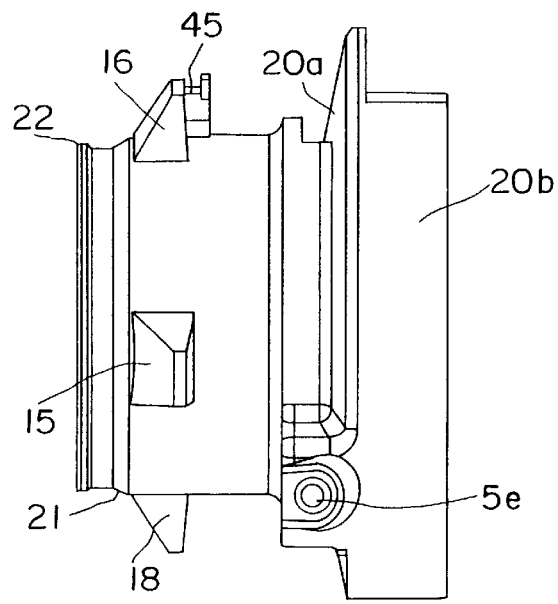
FIG. 7 shows an additional side view of the tubular extension of the cable winding mechanism, rotated by about 45° from the view shown in FIG. 4.
Figure 8:
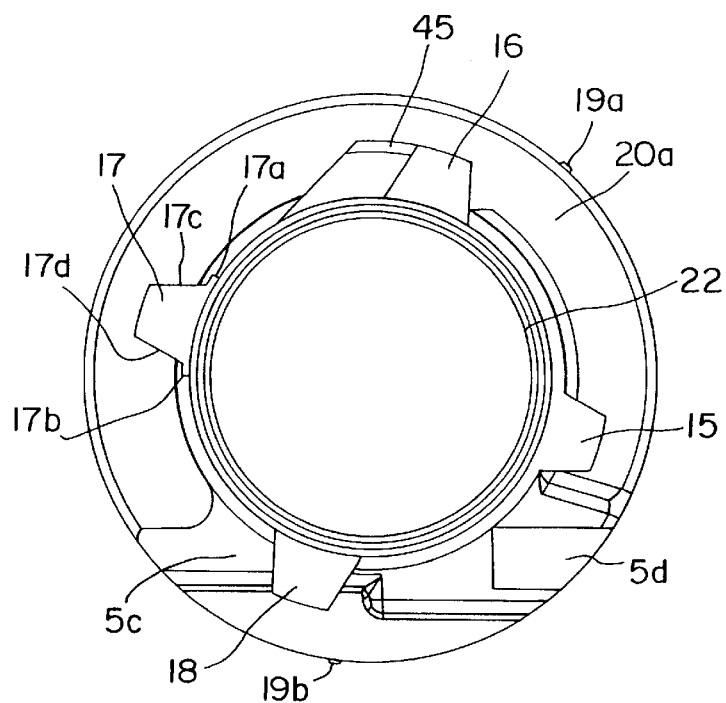
FIG. 8 shows an additional end view of the tubular extension of the cable winding mechanism, opposite of the end view shown in FIG. 6.

FIG. 7 shows another side view of the tubular extension 5a, rotated by about 45° from the view shown in FIG. 4. FIG. 8 shows an additional end view of the tubular extension 5a, opposite of the end view of the tubular extension 5a shown in FIG. 6.

In order to ensure the correct installation of the cable winding mechanism 5 of the cable winding portion 2 into the twist grip 1, one of the claws 15, 16, 17 or 18, in this particular case claw 17, can have a somewhat different configuration than that of the other claws 15, 16 and 18. Claw 17 can therefore have stepped portions 17a and 17b, which stepped portions 17a and 17b can preferably be located at the base of claw 17 (i.e. where claw 17 joins tubular extension 5a), and on both sides 17c and 17d of claw 17 (as best shown in FIG. 8). Of course other configurations of claw 17 would be within the scope of the present invention, and stepped portions 17a and 17b are presented as one example of a method for configuring claw 17 differently from the other claws 15, 16 and 18. As illustrated in FIG. 3, claw 17 can have a first side 110, a second side 112, a third side 111, a front side 113, a back side 114 and a base portion 115. In addition, the stepped portion 17b can have a first surface 116 and a second surface 117.

Twist grip 1, as shown in FIGS. 1 and 9–11, can, along the same lines, have four recesses 23, 24, 25 and 26 located in interior portion 4, in which recesses claws 15, 16, 17 and 18 of tubular extension 5a can be engaged. In FIG. 1 only one recess 23 can be seen, due to the particular orientation of the twist grip 1, but see FIG. 9. The recess 23 shown in FIG. 1 can preferably be configured to engage only with claw 17 of the tubular extension 5a, so that an incorrect installation of tubular extension 5a inside the twist grip 1 can be avoided. Thus, recess 23 can have stepped portions 23a and 23b for respectively engaging with stepped portions 17a and 17b of claw 17. The recess 23 can include a first side 100, a second side 102, a third side 101, a back side 103 and a base portion 104. The stepped portion 23b can also include a first surface 106 and a second surface 105.

With regard to the above, a specific orientation of the twist grip 1 with respect to the cable winding portion 2 may be desirable if the twist grip 1 has a marking on the exterior portion 3 at its largest diameter, such as an arrow for example, which marking can be used to point to the current gear in gear display 11 located on housing 9 of the cable winding portion 2. In this case, the claw and recess which are to have the different configuration than that of the other claws and recesses should be selected so the location of the "special" claw and recess coordinate with the location of the gear display 11 on the housing 9. In other words, the location of the "special" claw and recess should be chosen so that the range of rotation of the twist grip 1 coordinates with the location of the gear display 11 on the cable winding portion 2. In this situation, the indicator 12 shown in FIG. 1 which is located on the housing 9 essentially would not be necessary, since a marking or gear indicator would instead be located on the exterior portion 3 of the twist grip 1. Thus, once the twist grip 1 is connected to the cable winding portion 2, the marking on the twist grip 1 can be utilized to indicate the current gear of the bicycle transmission by pointing to a gear number shown in the gear display 11.

In addition, it should be understood that a greater or lesser number of claws 15, 16, 17, and 18 and recesses 23, 24, 25 and 26 would be within the scope of the present invention, provided that the number of claws is sufficient for transmitting the torque applied by the rider's hand or fingers to the cable winding mechanism 5.

In accordance with one embodiment of the present invention, the claws 15, 16, 17 and 18 can preferably be located at about 90° intervals from one another along tubular extension 5a. Similarly, recesses 23, 24, 25 and 26 can also be located at about 90° intervals from one another inside interior portion 4. Of course, it should be understood that the above-mentioned angular orientations of the claws 15, 16, 17, and 18 and recesses 23, 24, 25 and 26 with respect to one another are only one example of one type of configuration in accordance with the present invention, and that other configurations and/or orientations of the claws 15, 16, 17 and 18 and recesses 23, 24, 25 and 26 would be within the scope of the present invention.

The tubular extension 5a of the cable winding mechanism 5 can also preferably have an angled or sloped circular portion 21 located near claws 15, 16, 17, and 18, and a bead or flange 22 (see FIGS. 1, 3, 4, 5 and 7) located next to angled portion 21. Angled portion 21 can engage with a corresponding angled portion 27 (see FIG. 1) located in the interior portion 4 of the twist grip 1, and the bead 22 can likewise engage with a groove 28 located inwardly of angled portion 27 (see FIGS. 9 and 10). Thus, once the cable winding mechanism 5 has been inserted into the twist grip 1, and the claws 15, 16, 17 and 18 are engaged in a corresponding recess 23, 24, 25 and 26, bead 22 can be engaged in groove 28, and angled portion 21 can fit against angled portion 27. Once inserted into the twist grip 1, the tubular extension 5a will then be non-rotationally connected to the twist grip 1, such that when the twist grip 1 is turned by the rider, the interior portion or twist part 4 rotates, and thus rotates the tubular extension 5a, and, since the shifting cable is connected to the cable winding mechanism 5 by means of the guide 5c discussed hereinabove, the shifting cable can be moved along with the tubular extension 5a in order to change the gears of the bicycle by means of a hub transmission or derailleur transmission (see FIG. 15).

In other words, and in accordance with one embodiment of the present invention, one end of the control or shifting cable can preferably be fastened to the hub or derailleur transmission of the bicycle. This end of the cable can be biased by a spring or similar device in the bicycle transmission. The other end of the cable can be connected to the cable winding mechanism 5 by means of orifice 5f and guide 5c as discussed above. Thus, when for example, the rider upshifts (i.e. shifts from a lower gear to a higher gear), the cable is essentially released from the previous gear position, and can essentially be "unwound" from the tubular extension 5a of the cable winding mechanism 5. This motion of the cable can be assisted by the spring in the transmission which pulls on the cable. For this movement, i.e. upshifting, relatively little force is typically needed on the twist grip 1, so the portion of the twist grip 1 with the smaller diameter can preferably be used by the rider. Oppositely, when the rider downshifts (i.e. shifts from a higher gear to a lower gear), the cable is "wound" around the tubular extension 5a of the cable winding mechanism 5, against the force of the transmission spring. For this movement, i.e. downshifting, a larger force is typically needed on the twist grip 1, so the portion of the twist grip 1 having the larger diameter can be used by the rider in this situation for a more effective transmission of torque.

As best seen in FIG. 10, the interior portion 4 of the twist grip 1 can also have two stepped portions 29 and 30, located inwardly from groove 28. Stepped portion 29 can preferably have a smaller diameter than does the groove 28, and a larger diameter than stepped portion 30.

FIG. 12 shows an additional exploded view of a complete twist-grip shifter, which twist-grip shifter has a different twist grip 31 than the twist grip 1 discussed above, and also has a different cable connection or cap 34a than the cap 14a shown in FIG. 1. FIG. 13 shows the twist-grip shifter of FIG. 12 fully assembled. The twist grip 31 shown in FIGS. 12 and 13 has a different exterior surface 32 than that of exterior portion or grip part 3 of twist grip 1, otherwise, the twist-grip shifter shown in FIGS. 12 and 13 is essentially identical to the twist-grip shifter discussed hereinabove. The description presented herebelow can be considered to be one possible method of assembling the twist-grip shifter of the present invention.

The twist-grip shifter shown in FIGS. 12 and 13 can preferably have a bracket 33 which can be inserted inside one end of the cable winding portion 2. The bracket 33 is adjustable, and the distance between two ends 33a and 33b of the bracket 33 can be moved with respect to one another by means of a screw adjustment or other clamping arrangement, for the purpose of clamping the twist-grip shifter on the handlebar 8 (see FIG. 14) of the bicycle. As mentioned briefly above, a cable 34 can pass through the arm or cable inlet segment 13 of the cable winding portion 2, and the cable 34 can ultimately be fastened at one end to the cable winding mechanism 5 by insertion of the cable 34 into the guide 5c and the orifice 5f. The arm 13 of the cable winding portion 2 can include a guide part 35 and a cover 36, which guide part 35 and cover 36 are removable from the arm 13. Guide part 35 can be inserted inside the arm 13, and can serve to guide the cable 34 towards the guide 5c of the cable winding mechanism 5. The cable 34 can preferably extend along a guide wall 35a of guide 35, on a side of guide wall 35a, which guide wall 35a cannot be seen in FIG. 12 (but see FIG. 13D) due to the particular orientation of the guide 35, once the guide 35 has been inserted into the arm 13.

The cable winding mechanism 5, along with a slide 37 and a latching spring 38, can then be mounted over a tubular extension 39 (see also FIG. 1) of the cable winding portion 2. Once the cable winding mechanism 5 is installed on the tubular extension 39 of the cable winding portion 2, the cover 36 can then be positioned over the exposed cable 34 and screwed into place by means of a screw 40. The screw 40 can extend into a hole 41 in the arm 13. The cover 36 can preferably have a cylindrical mounting portion 42 having interior threads (not shown) for engaging with the threads of the screw 40.

Figure 13A:
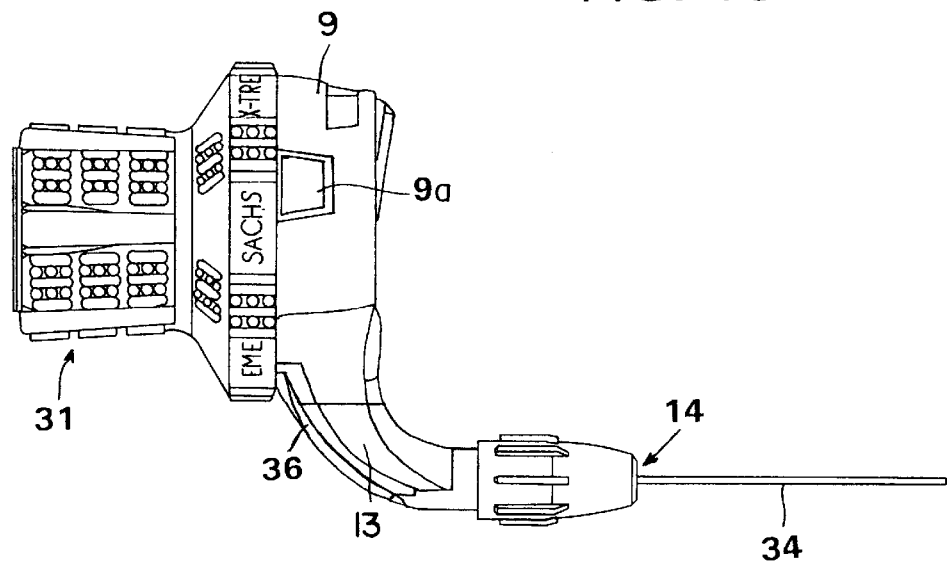
FIG. 13A also shows the twist-grip shifter of FIG. 12 fully assembled, but shows the opposite side of the twist-grip shifter than that shown in FIG. 13.
Figure 13B:
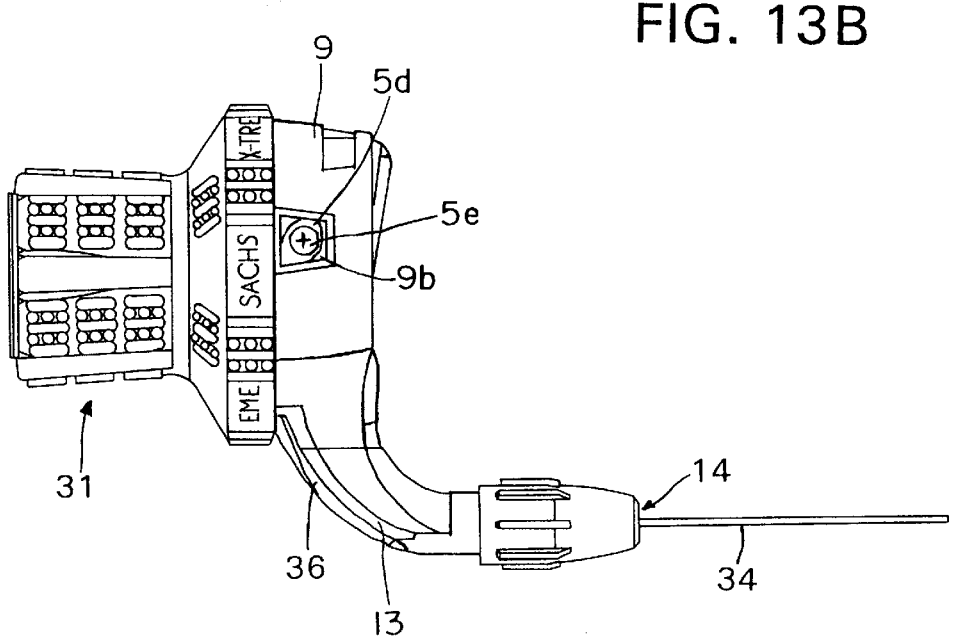
FIG. 13B shows substantially the same view as shown in FIG. 13A, but with the cover panel removed.

In accordance with one embodiment of the present invention, if the cable 34 needs to be replaced, for example if the cable 34 breaks, the process of changing the cable 34 can be relatively simple. In order to facilitate easy changing of the cable 34, the housing 9 of the cable winding portion 2 can preferably include a cover panel 9a, which panel 9a is removable from the housing 9. FIG. 13A shows the opposite side of the twist-grip shifter shown in FIG. 13, and thus shows the cover panel 9a in place on the housing 9. FIG. 13B also shows the opposite side of the twist-grip shifter shown in FIG. 13, but shows the cover panel 9a removed from the housing 9. When the cable 34 is to be replaced with a new cable, the cover panel 9a can be removed, which removal can preferably expose a window 9b (see FIG. 13B) in housing 9, and the flared end 5d of orifice 5f, and also the cap 5e. However, some rotation of the grip part 31 may be necessary in order to align the flared end 5d of orifice 5f with the window 9b. Thus, the grip part 31 can preferably be rotated until the cap 5e appears in window 9b, and the opposite end of the cable 34 which is connected to the transmission of the bicycle can be disengaged from the transmission. The cable 34 can then be pulled through arm 13 and guide 5c, and out of window 9b by means of the cap 5e. A new cable can then be installed by threading the transmission end of the cable into window 9b, through guide 5c, through arm 13, and out of the hole 14 in arm 13. Thus, very little disassembly of the twist-grip shifter is necessary in order to change the cable 34, other than to remove the cover panel 9a.

Figure 13C:
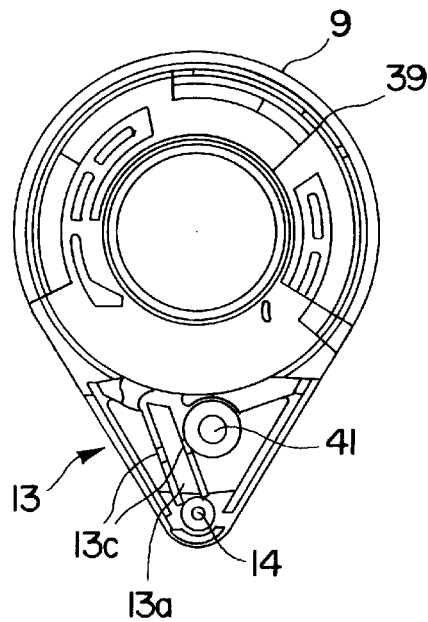
FIG. 13C shows the interior of the cable winding portion.
Figure 13D:
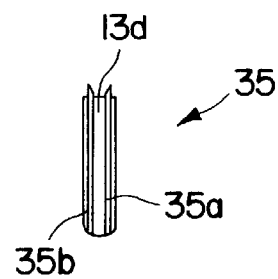
FIG. 13D shows a frontal view of the guide.
Figure 13E:
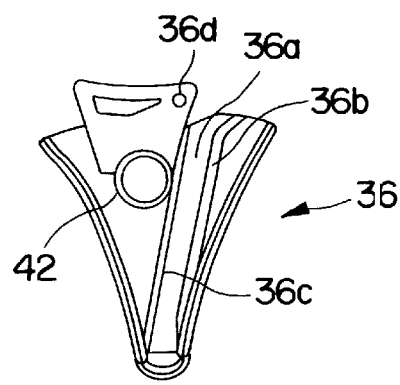
FIG. 13E shows the interior of the cover for the arm or cable inlet segment.

In order to ensure that the new cable is accurately guided through the arm 13, the arm 13, which arm 13 is shown in FIG. 13C with the cover 36 and the guide part 35 removed therefrom, can have a channel 13a in which the guide part 35 can preferably be engaged. The guide part 35 can engage in the channel 13a by means of a projecting portion 13b (see FIG. 12) disposed on the guide 35, which projecting portion 13b fits into two recesses 13c in channel 13a. The recesses 13c can preferably be disposed transversely with respect to the channel 13a. The guide part 35, a frontal view of which is shown in FIG. 13D, can also have a channel 13d bordered by guide wall 35a mentioned hereinabove and an additional parallel guide wall 35b. Thus, the new cable can be guided in the channel 13d by walls 35a and 35b. Similarly, as shown in FIG. 13E, the cover 36 can also have a guide channel 36a. FIG. 13E shows a frontal view of the cover 36, wherein only a side view of the cover 36 is shown in FIG. 13. The guide channel 36a is bordered by two guide walls 36b and 36c. The guide channel 36a, once the cover 36 is in place on the arm 13, can be joined with the channel 13d of the guide part 35 to form a guide channel which can preferably enclose the cable on essentially all sides. In particular, since the channel 36a is preferably wider than the channel 13d, the walls 35a and 35b of guide part 35 can fit inside channel 36a of the cover 36, and each of the walls 35a and 35b of guide 35 can contact walls 36b and 36c, respectively.

Referring back to FIG. 12, a torsion spring 43 can be disposed about the tubular extension 5a, in a gap 44 behind the claws 15, 16, 17 and 18, one end (not shown) of which spring 43 can have a hook for permitting attachment of the spring 43 to a portion 45 (see also FIGS. 3, 7 and 8) of claw 16. The other end 46 of torsion spring 43 can be inserted into a hole 36d in cover 36, which hole 36d cannot be seen due to the particular view of the cover 36 shown in FIG. 12, but see FIG. 13E. In accordance with one possible embodiment, spring 43 can exert a biasing force on the tubular extension 5a in an opposite direction than the force of the transmission spring, as discussed above, on the transmission end of cable 34, which cable 34 is connected to the tubular element 5a. Twist grip 31 can then be fitted over the tubular extension 5a of the cable winding mechanism 5 in the manner discussed hereinabove, so that claw 17 engages with recess 23, and claws 15, 16 and 18 engage with a corresponding recess 24, 25 or 26. FIG. 13 shows the twist-grip shifter of FIG. 12 completely assembled.

Figure 15:
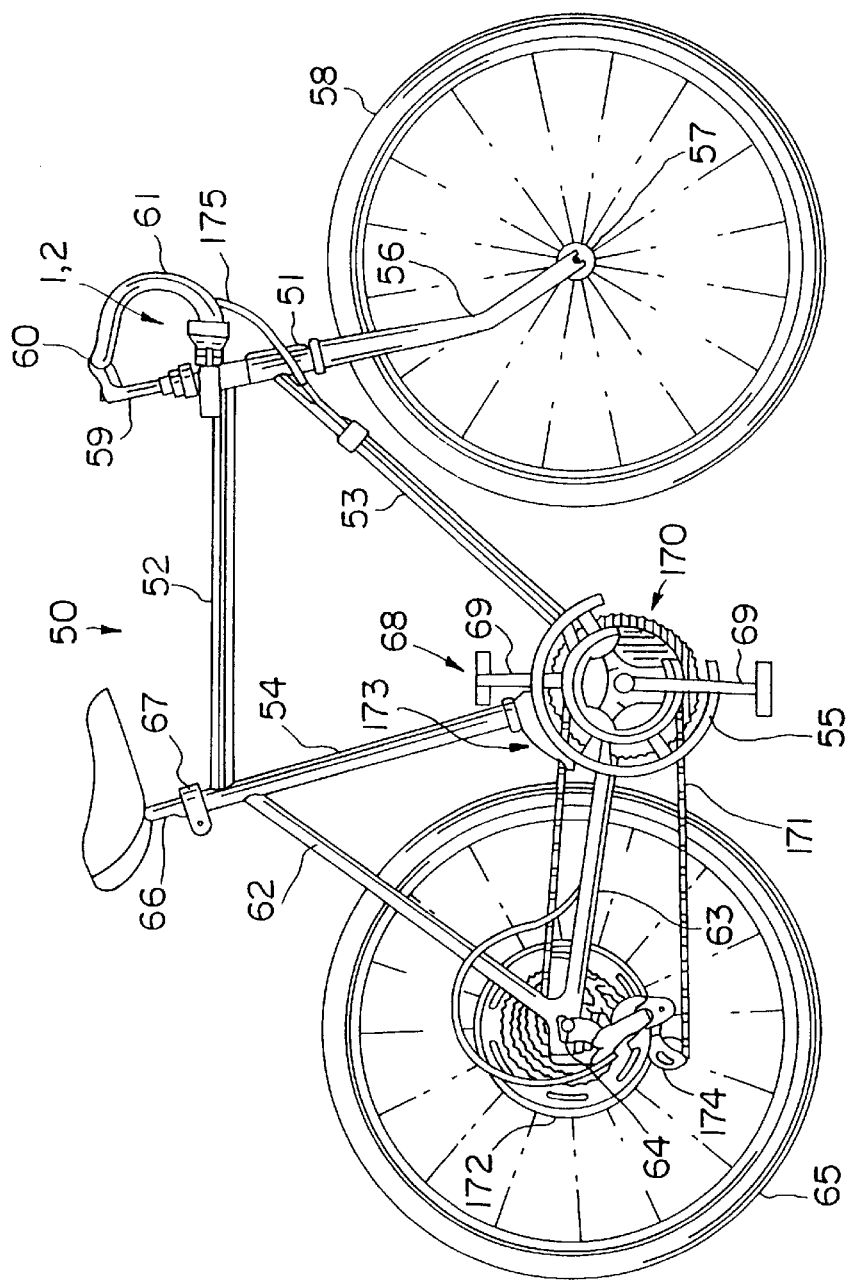
FIG. 15 shows one example of a bicycle and bicycle transmission incorporating the present invention.

FIG. 15 shows one example of a bicycle 50, in which a rear derailleur mechanism can be actuated by a rear twist-grip shifter in accordance with the present invention, and a two-chain front derailleur mechanism which can be actuated by a front twist-grip shifter in accordance with the present invention. It should be understood that the description which follows is presented only as an example of one type of bicycle and transmission system in which the present invention could be utilized. Thus, the present invention could also be utilized with other types of bicycles and bicycle transmissions, such as hub transmissions.

The bicycle 50 has a primary frame which is generally triangular in shape, and which includes a head tube 51, a generally horizontal top tube 52 connected at its front end to head tube 51, a main down tube 53 extending downwardly and rearwardly from head tube 51, and a seat tube 54 connected to the rear end of top tube 52 and extending downwardly and forwardly therefrom. Main down tube 53 and seat tube 54 are joined at their lower ends to bottom bracket 55, shown in phantom, within which bottom bracket 55 the pedal crank is horizontally journalled.

A front fork 56 defines the axis 57 of front wheel 58. A steering tube (not shown) at the upper end of front fork 56 extends upwardly into head tube 51, and is wedge-clamped to a handlebar stem designated 59, which stem 59 extends down into the steering tube within head tube 51. Handlebar stem 59 includes a handlebar clamp 60 at its upper end for gripping handlebar 61. The handlebar 61 shown in FIG. 15 is of the traditional drop bar type, although it is to be understood that the present invention is equally applicable to virtually any type of bicycle handlebar.

A down fork 62 consisting of left and right seat stays extends downwardly and rearwardly from the upper portion of seat tube 54, and a bottom fork 63 consisting of left and right chain stays extends rearwardly from bottom bracket 55. The left sides of down fork 62 and bottom fork 63 are connected at their rear ends, and similarly the right sides of down fork 62 and bottom fork 63 are connected at their rear ends, and these rear connections support rear wheel dropouts which define the axis 64 of rear wheel 65.

A seat stem 66 is engaged in the upper end of seat tube 54, and is releasably secured by a seat clamp 67. The pedal crank, generally designated 68, is rotatably journalled in bottom bracket 55, and includes right and left crank arms 69. A chain wheel cluster designated 170 is rigidly supported on pedal crank 68, and constitutes the sprocket cluster of the front derailleur assembly. Most commonly, the chain wheel cluster will embody two chain wheels, although it is also common to have chain wheel clusters with three chain wheels. An endless drive chain 171 transmits power from the chain wheel cluster 170 to a multiple freewheel 172 that is operatively connected to the rear wheel hub mechanism in a conventional manner.

A front derailleur mechanism designated 173 cooperates with chain wheel cluster 170 to shift chain 171 laterally between two chain wheels of cluster 170, down-shifting from the smaller chain wheel to the larger chainwheel, or up-shifting from the larger chain wheel to the smaller chain wheel. A rear derailleur mechanism designated 174 is pivotally connected to the frame proximate the right side portions of down fork 62 and bottom fork 63 for shifting chain 171 laterally from sprocket to sprocket of the multiple freewheel 172. A front control cable (not shown) operatively connects a front twist-grip shifter (not shown) in accordance with the present invention to the front derailleur mechanism 173 such that the front twist-grip shifter cooperates with and controls the shifting of the front derailleur mechanism 173. Similarly, a rear control cable 175 operatively connects a rear twist-grip shifter, including twist grip 1 and cable winding portion portion 2 in accordance with the present invention, to the rear derailleur mechanism 174 such that the rear twist-grip shifter cooperates with and controls the shifting of the rear derailleur mechanism 174.

Referring back to FIG. 1, the disclosure now turns to an additional feature of the present invention relating to a seal between the cable winding portion 2 and the twist grip or grip part 1. As mentioned above, FIG. 1 shows the twist grip or grip part 1 and the cable winding portion 2 disassembled from one another, which is useful here for illustrating the seal between the two parts.

Since it is highly desirable to prevent dirt and debris from entering the interior of the twist-grip shifter, a seal can preferably be provided adjacent the connection of the cable winding portion 2 and the twist grip 1. In accordance with the embodiment shown in FIG. 1, the seal can be a contactless or frictionless seal that includes a collar, tongue or flange 70 disposed about the connecting end of the cable winding portion 2, and a groove 71 formed in the connecting end of the interior portion 4 of the frusto-conical part 107 of the twist grip 1. The collar 70 can be integral with the housing 9, or can be separate component and attached to the housing 9.

The collar 70 of the cable winding mechanism 2 can preferably be positioned with respect to the groove 71 so that when the cable winding portion 2 and the twist grip 1 are fastened to one another, as discussed in detail herebelow, the collar 70 essentially does not contact the walls of the groove 71. When fully assembled, the twist grip 1 can rotate along with the cable winding mechanism 5, which cable winding mechanism 5 is located inside the cable winding portion 2, and the collar 70 and housing 9 of the cable winding portion 2 can remain essentially stationary with respect to the twist grip 1 and the cable winding mechanism 5. Thus, the groove 71 can rotate with respect to the collar 70.

Figure 16:
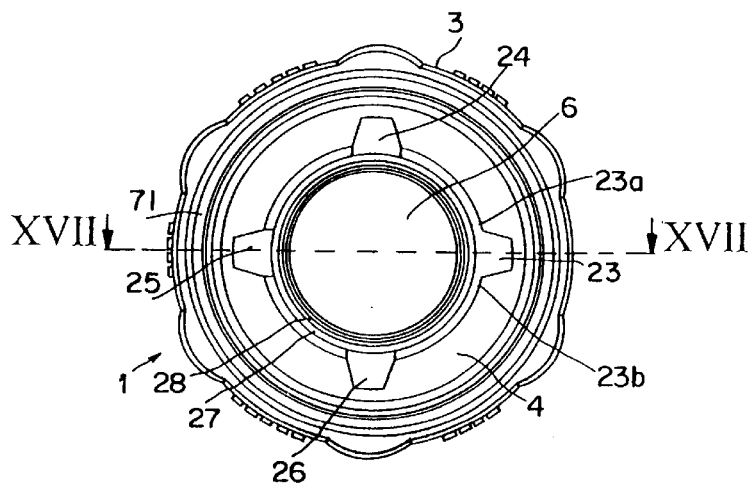
FIG. 16 shows an end view of the twist grip of the twist-grip shifter shown in FIG. 1.
Figure 17:
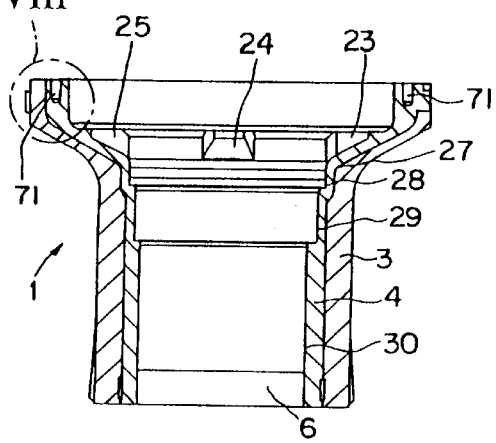
FIG. 17 shows a cross-section of the twist grip shown in FIG. 1.
Figures 18, 18A, 19:
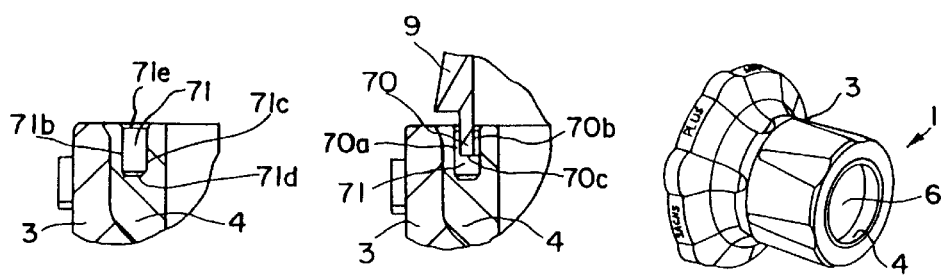
FIG. 18 shows an enlarged view of the groove of the twist grip shown in FIG. 17.
FIG. 18A shows essentially the same view as FIG. 18, but shows the collar.
FIG. 19 shows an additional perspective view of the twist grip shown in FIG. 1.

FIGS. 16, 17, 18, 18A and 19 show additional views of the twist grip 1 shown in FIG. 1. Specifically, FIG. 16 shows an end view of the twist grip 1, wherein essentially the entire interior portion 4 can be seen. FIG. 17 shows a cross-section of the twist grip 1 in FIG. 16, FIG. 18 shows an enlarged view of the groove 71 shown in FIG. 17, FIG. 18A shows a view similar to FIG. 18 (but also shows the collar 70), and FIG. 19 shows an additional perspective view of the twist grip 1. FIGS. 16, 17 and 19 are essentially the same views shown in FIGS. 9, 10 and 11, but show additional components.

FIGS. 18 and 18A respectively show enlarged views of the groove 71 and the collar 70 disposed within the groove 71. The groove 71 can preferably have two essentially parallel side walls 71b and 71c, a bottom wall 71d, and a flared or angled end portion 71e. Collar 70 likewise can have a generally rectangular cross-section, with two essentially parallel side walls 70a and 70b, and a bottom wall 70c. As can be seen in FIG. 18A, the seal between the cable winding portion 2 and the twist grip 1 can be contactless, or virtually contactless, since the collar 70 preferably does not come into contact with the walls 71b, 71c, and 71d of groove 71.

Figure 20:
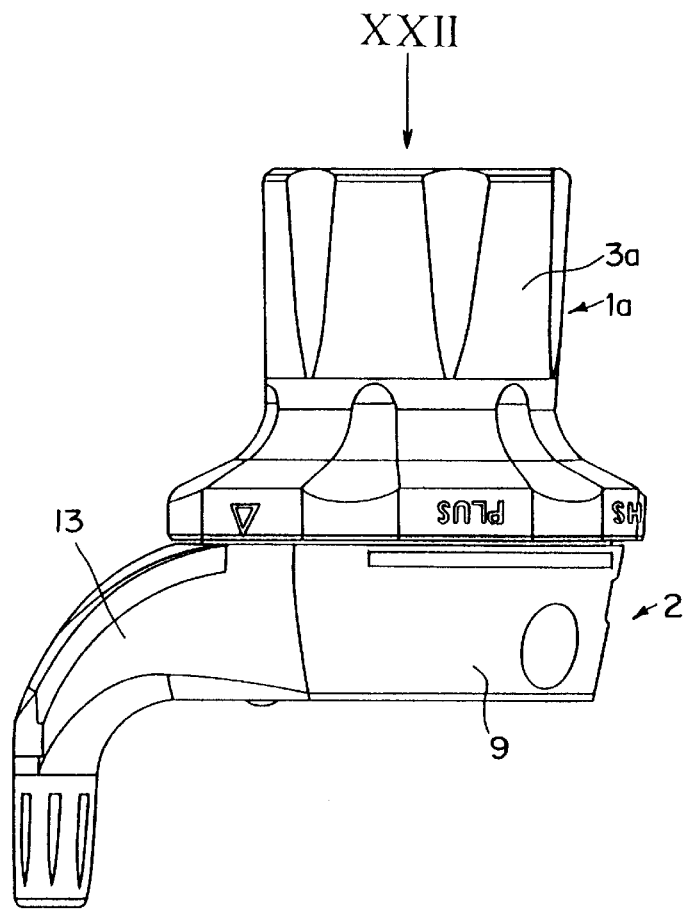
FIG. 20 shows a side view of the cable winding portion and a twist grip connected to one another.
Figure 21:
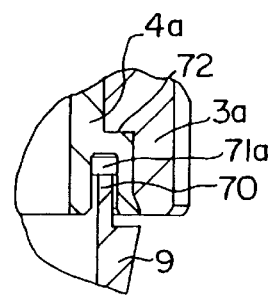
FIG. 21 shows a cross-section of the seal between the cable winding portion and the twist grip of FIG. 20.
Figure 22:
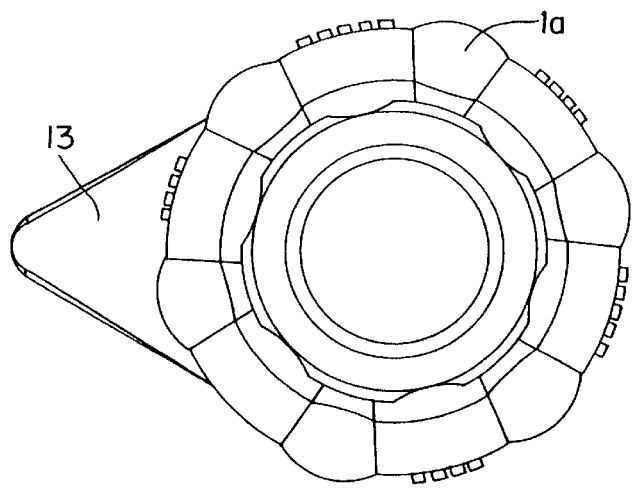
FIG. 22 shows an end view of FIG. 20.

FIGS. 20, 21 and 22 show the cable winding portion 2 and an additional embodiment of a twist-grip 1a wherein the twist grip 1a has an end portion which is configured somewhat differently than that of the twist grip 1 shown in detail in FIGS. 18 and 18A. FIG. 20 shows a side view of the cable winding portion 2 and the twist grip 1a connected to one another, FIG. 22 shows an end view of FIG. 20, and FIG. 21 shows a cross-section of the seal between the cable winding portion 2 and the twist grip 1a. Components of the twist grip 1a shown in FIG. 21 which are similar to components of the twist grip 1 have been given the same reference numbers plus an "a". Essentially the only difference between the end portion of the twist grip 1a and the end portion of the twist grip 1 is that the interior portion 4 of twist grip 1 (shown in FIGS. 18 and 18A) can preferably be rounded along its juncture with the exterior portion 3, and, in contrast, the end portion of twist grip 1a preferably has a stepped portion 72.

Figure 23:
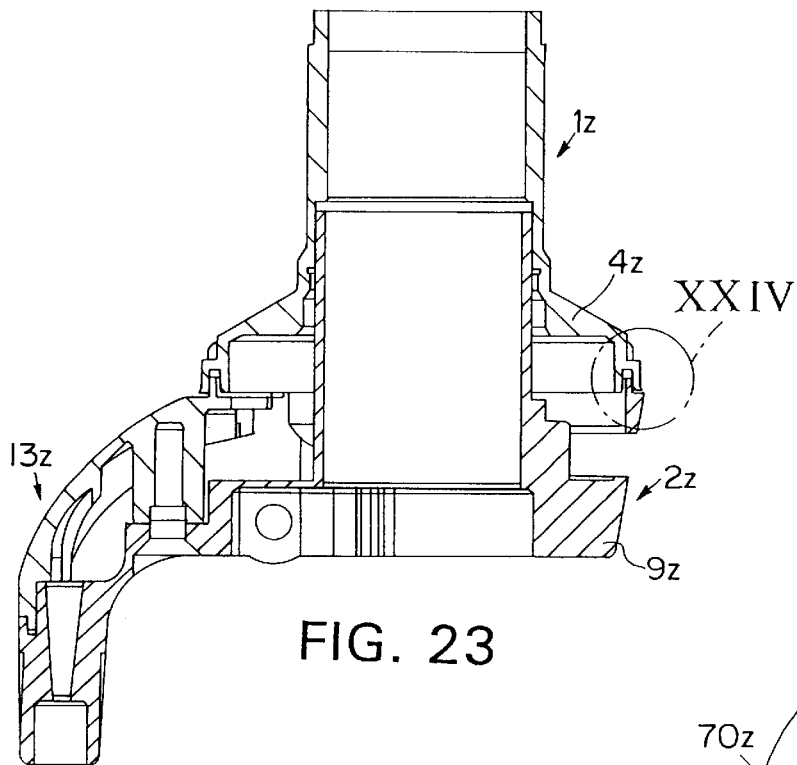
FIG. 23 shows an additional embodiment of a twist-grip shifter.
Figure 24:
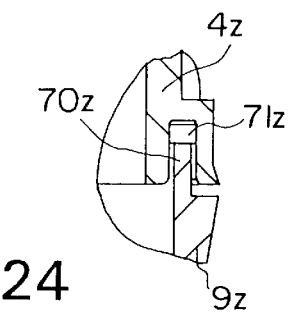
FIG. 24 shows a cross-sectional, enlarged view of the seal between the cable winding portion and twist grip of FIG. 23.
Figure 25:
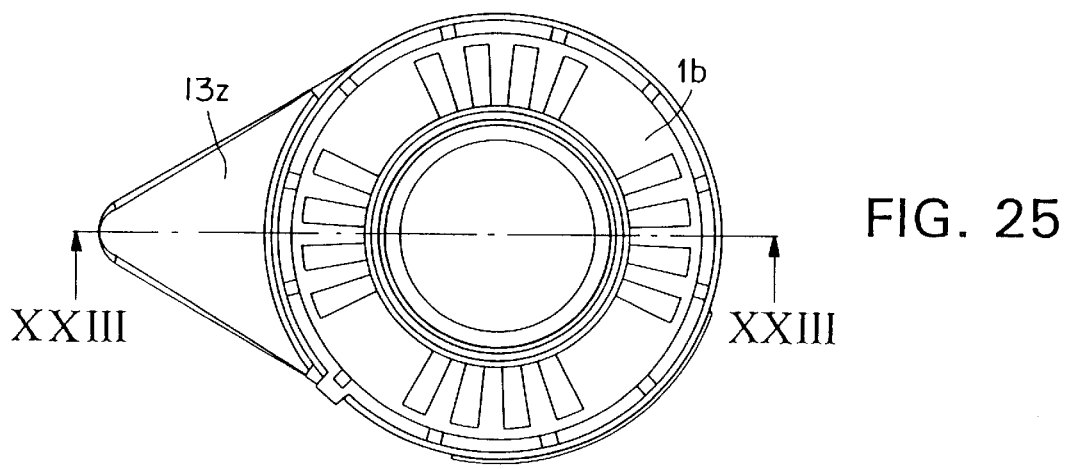
FIG. 25 shows an end view of the twist-grip shifter of FIG. 23.

FIGS. 23, 24 and 25 show an additional embodiment of a twist-grip shifter in accordance with the present invention, wherein FIG. 23 shows a cross-section of FIG. 25, which FIG. 25 shows an end view, and FIG. 24 shows a cross-section of the seal of FIG. 23, which shows the seal formed by twist grip 1z and cable winding portion 2z. Components which are similar to the components of the twist grip 1 and cable winding portion 2 have been given the same reference numbers plus a "z". The seal shown in FIG. 24 is similar to the seal shown in FIG. 21, with the exception that the embodiment shown in FIGS. 23, 24 and 25 does not include an exterior portion such as the exterior portion 3 and 3a shown in FIGS. 1 and 20, respectively.

FIGS. 26, 26A, 26B, 27 and 28 show an additional embodiment similar to that shown in FIGS. 16–19, but wherein the seal is not a contactless or frictionless seal, but can be considered a lip seal or friction seal. This type of seal is useful for bicycles which are primarily used for competitive events, such as racing for example, where debris can typically be much more common and plentiful. Thus, since the chance of debris entering the interior portion of the twist-grip shifter is typically greater with competition bicycles, a lip seal or friction seal may highly desirable. Essentially the only difference between the embodiment shown in FIGS. 26–28 and the embodiment shown in FIGS. 16–19 is that the exterior portion 3x of FIGS. 26–28 can preferably be molded to have a flange or lip seal 73. The seal 73 can preferably extend towards the collar 70, over part of the groove 71, and can ultimately contact the collar 70.

Figure 26:
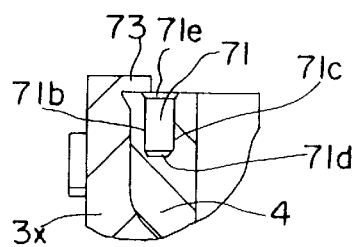
FIG. 26 shows a cross-section of the seal between the cable winding portion and twist grip of an additional embodiment of a twist-grip shifter.
Figure 26A:
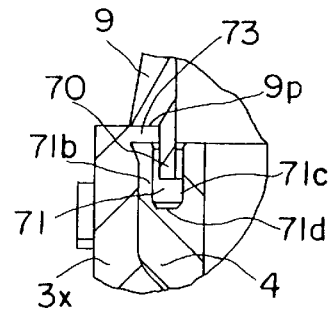
FIG. 26A shows a view similar to that of FIG. 26, but shows the collar.
Figure 27:
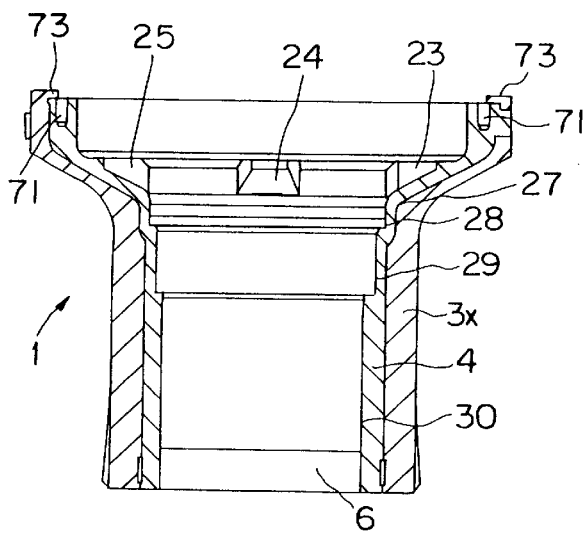
FIG. 27 shows a cross-section of the twist grip of FIGS. 26 and 26A.
Figure 26B:
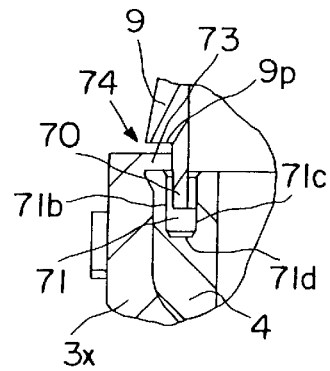
FIG. 26B shows a view similar to that of FIG. 26A, but shows an additional embodiment of a seal.
Figure 28:
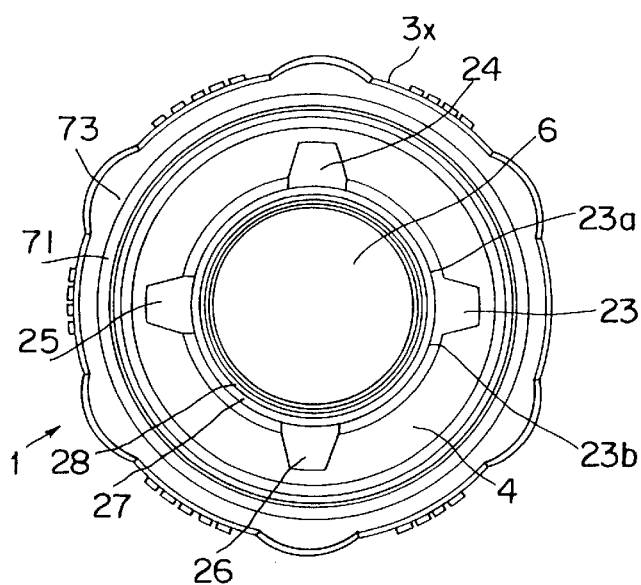
FIG. 28 shows an end view of the twist grip shown in FIG. 26.

As shown in FIG. 26A, the lip seal 73 can also contact a portion 9p of the housing 9, however, this contact between the housing portion 9p and seal 73 may not be necessary. In the embodiment shown in FIG. 26B, a gap 74 can preferably be disposed between the housing portion 9p and the seal 73, if desired.

Figure 29:
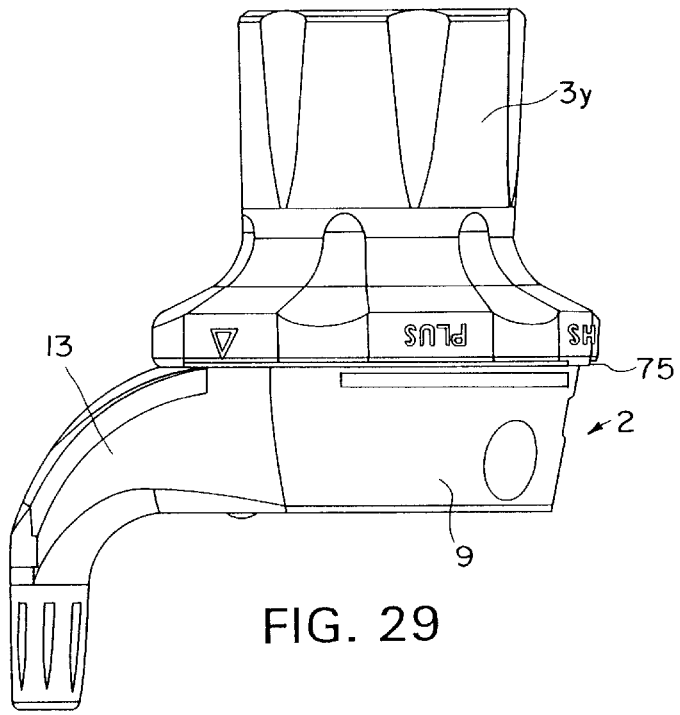
FIG. 29 shows an additional embodiment of a twist-grip shifter.
Figure 30:
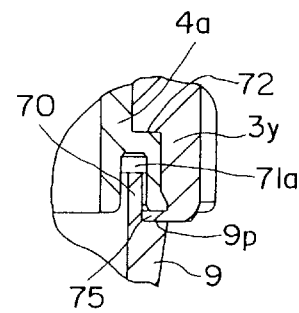
FIG. 30 shows a cross-section of the seal of FIG. 29.
Figure 30A:
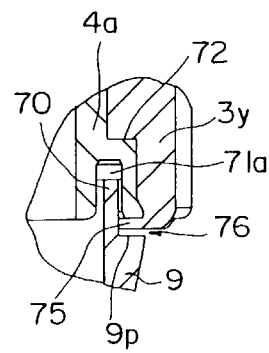
FIG. 30A shows a view similar to FIG. 30, but shows an additional embodiment of a seal.
Figure 31:
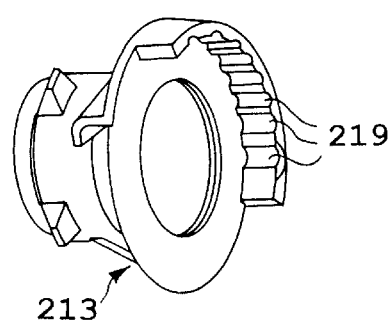
FIGS. 31, 32, 33, 34 and 35 show various aspects of one embodiment of the detent element.
Figure 32:
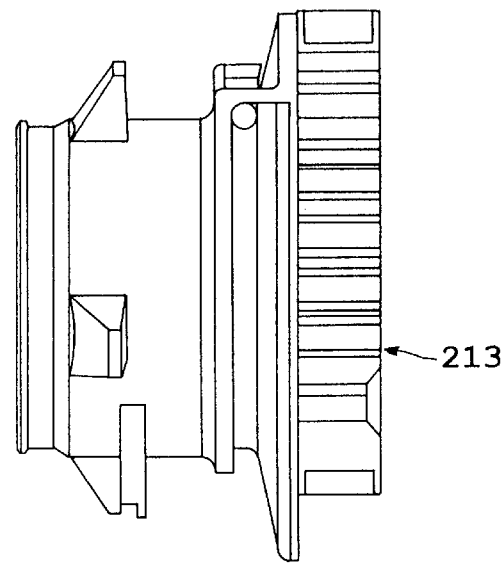
Figure 33:
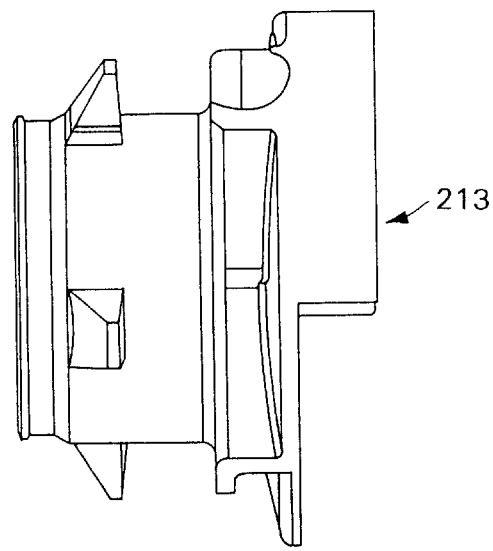
Figure 34:
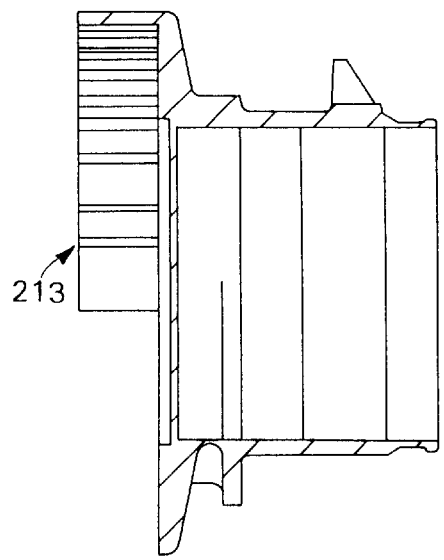
Figure 35:
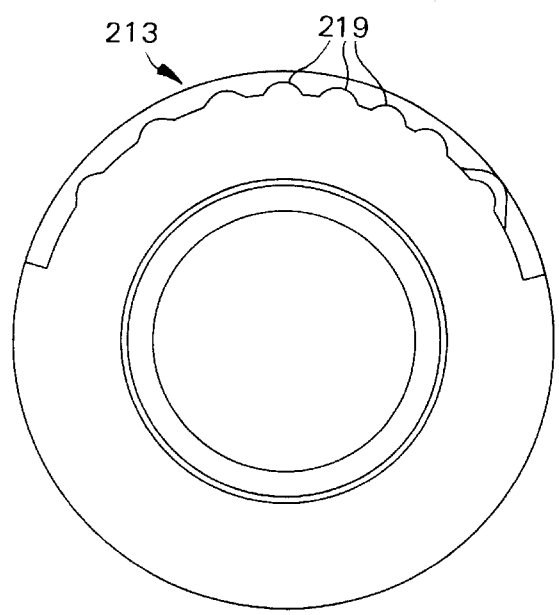

FIGS. 29, 30 and 30A show an embodiment similar to that shown in FIGS. 20–22, but wherein the embodiments shown in FIGS. 29–30A instead include a lip seal or friction seal. The embodiments shown in FIGS. 29–30A include a flange or lip seal 75 which can be molded from the exterior portion 3y. The seal 75 can, as discussed above with regard to FIGS. 26–28, extend toward the collar 70, over part of the groove 71, and can contact the collar 70. Similar to the the embodiments of FIGS. 26–28, the lip seal 75 shown in the embodiment of FIG. 30 can contact housing portion 9p. The embodiment shown in FIG. 30A can preferably include a gap 76 between housing portion 9p and seal 75.

Other types of seals which may be utilized in accordance with the present invention are presented herebelow, near the close of the instant specification. Thus, it should be understood that the types of seals discussed hereinabove are only several variations of seals which could be used in accordance with the present invention, and that the present invention should not be interpreted as being limited to the specific seals mentioned hereinabove.

FIGS. 31, 32, 33, 34, and 35 show various aspects of one embodiment of the detent element or latching element 19. FIGS. 31–35 also show an additional embodiment of tubular element 5a. The views shown present the parts of the detent element main body that interfaces with the rotational grip part 1. The various connecting prongs may be used to facilitate the user's selection of gear. Also, the FIGS. 31 and 35 clearly show the detent positions 219 that a lug of a detent spring (not shown) could rest in to restrain the actuator cable.

Figure 36:
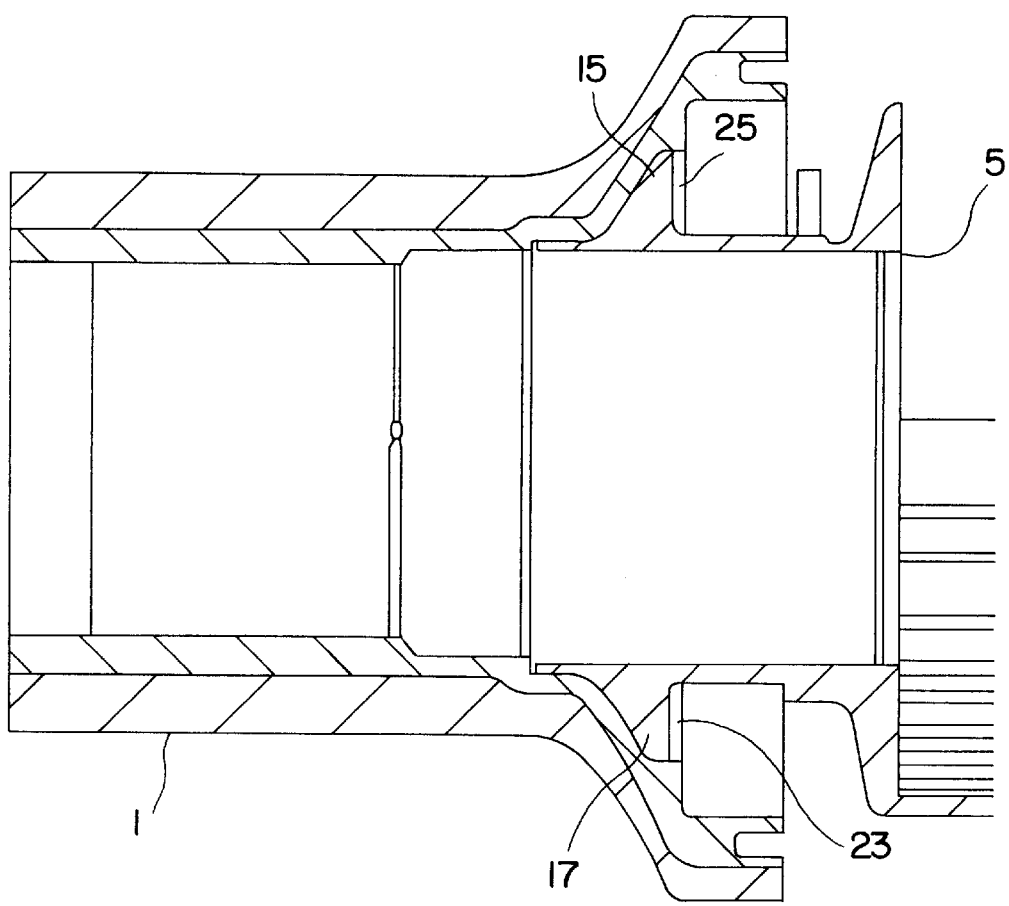
FIG. 36 shows a cross-section of the twist grip engaged with the cable winding mechanism.

FIG. 36 shows a cross-section of the cable winding mechanism 5 engaged with the grip part 1. Projections 15 and 17 of the cable winding mechanism 5 are shown in and engaged with recesses 25 and 23 of the grip part 1.

Types of transmissions for bicycles, and components thereof, which may be utilized in accordance with the embodiments of the present invention may be disclosed in the followin U.S. Patents: U.S. Pat. No. 3,944,253 to Ripley on Mar. 16, 1976, entitled "Infinitely Variable Transmission for Pedal-Driven Vehicles"; No. 4,973,297 to Bergles on Nov. 27, 1990, entitled "Multispeed Drive Hub With More Than Three Speeds"; No. 4,721,015 to Hartmann on Jan. 26, 1988, entitled "Three Stage Planetary Driving Wheel for Pedal Powered Vehicles"; No. 4,063,469 to Bergles on Dec. 20, 1977, entitled "Multiple Speed Hub for a Vehicle Wheel"; No. 4,727,965 to Zach et al.; No. 4,721,013 to Steuer et al.; No. 4,651,853 to Bergles et al.; No. 4,628,769 to Nagano; No. 4,400,999 to Steuer; No. 5,273,500; and No. 5,443,279 to Nurnberger.

Examples of bicycle derailleur cable actuating systems which may be utilized in accordance with the present invention may be found in the followin U.S. Patents: U.S. Pat. No. 5,197,927 to Patterson et al. on Mar. 30, 1993; No. 5,102,372 to Patterson et al. on Apr. 7, 1992; and No. 4,938,733 to Patterson on Jul. 3, 1990.

Examples of bicycles, in which the embodiments of the present invention may be employed, may be found in the following U.S. Patents: U.S. Pat. No. 5,324,059, which issued to Bryne on Jun. 28, 1994; No. 5,312,125 which issued to Tse-acu-a-o-shu on May 17, 1994; No. 5,242,182, which issued to Bezerra et al. on Sep. 7, 1993; and No. 5,240,268, which issued to Allsop et al. on Aug. 31, 1993.

Examples of derailleurs, which may be utilized in accordance with the embodiments of the present invention, may be found in the followin U.S. Patents: U.S. Pat. No. 4,439,171, which issued to Bergles on Mar. 27, 1984; No. 4,231,264, which issued to Bergles on Nov. 4, 1980; No. 4,183,255, which issued to Leiter on Jan. 15, 1980; and No. 3,927,904, which issued to Bergles on Dec. 23, 1975.

Examples of bicycle shifting mechanisms which may be utilized in accordance with the embodiments of the present invention, may be disclosed in the followin U.S. Patents: U.S. Pat. No. 4,900,291, which issued to Patterson on Feb. 13, 1990, entitled "Bicycle Gear Shifting Method and Apparatus"; No. 4,938,733, which issued to Patterson on Jul. 03, 1990, entitled "Bicycle Gear Shifting Method and Apparatus"; No. 5,009,629, which issued to Tagawa on Apr. 23, 1991, entitled "Shift Lever Assembly for Bicycle"; No. 5,102,372, which issued to Patterson et al on Apr. 07, 1992, entitled "Bicycle Derailleur Cable Actuating System"; No. 5,135,441, which issued to Gelbien on Aug. 04, 1992, entitled "Shifting Apparatus for Multispeed Bicycles"; No. 5,178,033, which issued to Kund on Jan. 12, 1993, entitled "Bicycle Gear Display"; No. 5,186,071, which issued to Iwasaki on Feb. 16, 1993, entitled "Bicycle Speed Change Lever Assembly"; No. 5,186,072, which issued to Nagano on Feb. 16, 1993, entitled "Bicycle Speed Control System for Controlling a Change Speed Device Through a Change Speed Wire"; No. 5,191,807, which issued to Hsu on Mar. 09, 1993, entitled "Indexed Gear-Shift Mechanism"; No. 5,197,927, which issued to Patterson et al on Mar. 30, 1993, entitled "Bicycle Derailleur Cable Actuating System"; No. 5,205,794, which issued to Browning on Apr. 27, 1993, entitled "Shift Mechanism for Bicycle"; No. 5,213,005, which issued to Nagano on May 25, 1993, entitled "Speed Control Device for Bicycle Derailleur"; No. 5,241,878, which issued to Nagano on Sep. 07, 1993, entitled "Bicycle Control Device"; No. 5,287,766, which issued to Nagano on Feb. 22, 1994, entitled "Speed Control Apparatus for a Bicycle"; No. 5,303,608, which issued to Iwasaki on Apr. 19, 1994, entitled "Bicycle Speed Change Lever Assembly"; No. 5,315,891, which issued to Tagawa on May 31, 1994, entitled "Bicycle Speed Change Operation Assembly"; No. 5,322,487, which issued to Nagano on Jun. 21, 1994, entitled "Self-Contained Change Speed Apparatus with Shaped Pawls to Equalize a Shifting Force for a Bicycle"; No. 5,325,735, which issued to Nagano on Jul. 05, 1994, entitled "Bicycle Speed Control Apparatus Having a Speed Indicator"; No. 5,354,240, which issued to Hunter, Jr. on Oct. 11, 1994, entitled "Variable Transmission"; No. 5,355,745, which issued to Wu and Hsuan on Oct. 18, 1994, entitled "Bicycle Speed Controller"; and No. 5,361,645, which issued to Feng and Kang on Nov. 08, 1994, entitled "Shift Lever Apparatus for Use in Bicycle".

Examples of methods for making decorated injection moldings which may be utilized in accordance with the present invention can be found in U.S. Pat. No. 4,427,615 entitled "Method of Making Injection Moulded Plastic Objects with Imbedded Decorative and/or Descriptive Prints".

Examples of methods for molding rubber onto a plastic molding which may be utilized in accordance with the present invention can be found in U.S. Pat. Nos. 4,896,922 to Guthe on Jan. 30, 1990, entitled "Plastic Wheel Assembly"; 4,970,103 to Wolf et al. on Nov. 13, 1990, entitled "Preformed Part Made of Plastics with Integrally Formed Rubber Elastic Parts"; 4,743,422 to Kalriss-Nielsen et al. on May 10, 1988, entitled "Method for Manufacturing a Sealing Body for a Pipe Joint"; and 5,302,336 entitled "Method for Producing Molded Hose Branches from Rubber and a Hose Produced by the Method".

An additional example of a method for making a molded article having a coating can be found in U.S. Pat. No. 4,961,894 entitled "Process for Producing Synthetic Resin Molded Articles".

Examples of injection molding machines and/or methods which can be utilized in accordance with the present invention can be found in U.S. Pat. No. 4,954,074 entitled "Injection Bladder Press", U.S. Pat. No. 5,059,113 entitled "Injection Molding Apparatus", U.S. Pat. No. 5,087,190 entitled "Multiplunger Molding Machine for Liquid Silicone Rubber", U.S. Pat. No. 4,540,359 entitled "Injection Molding Machine", U.S. Pat. No. 3,921,963 entitled "Injection Molding Machine Construction and Method of Operation", U.S. Pat. No. 3,904,078 entitled "Injection Molding Machine having a Programming Device and a Method of Operating the Machine", and U.S. Pat. No. 5,200,208 entitled "Multi-station Rubber Injection Molding Machine".

Examples of injection moldable thermoplastic materials which may be utilized in accordance with the present invention can be found in U.S. Pat. Nos. 4,902,738 to Mitsuno et al. on Feb. 20, 1990, entitled "Thermoplastic Elastomer Composition and Process for Producing Same"; 5,100,960 to Grigo et al. on Mar. 31, 1992, entitled "Thermoplastic Molding Composition of a Polysiloxane Block Copolycarbonate and a Polycarbonate Based on Certain Dihydroxydiphenylcyclo Alkanes"; 5,187,230 entitled "Rubber-modified Polymer Blends of Polycarbonate and PETG"; and 5,095,063 to Okada et al. on Mar. 10, 1992, entitled "Polypropylene Composition".

Examples of injection moldable rubber compositions which may be utilized in accordance with the present invention can be found in U.S. Pat. Nos. 5,082,886 to Jeram et al. on Jan. 21, 1992, entitled "Low Compression Set, Oil and Fuel Resistant, Liquid Injection Moldable, Silicone Rubber"; 5,010,136 to Ohmae et al. on Apr. 23, 1991, entitled "Process for Producing Impact-resistant Polyamide Resin Compositions"; and 5,145,897 to Levif et al. on Sep. 8, 1992, entitled "Rubbery Composition and Polynorbornene-based Thermoplastic Elastomer with Improved Heat Stability".

Examples of injection-compression molding machines and/or methods can be found in U.S. Pat. No. 5,059,364 entitled "Injection-Compression Molding Machine and Method of Molding by Using the Machine", U.S. Pat. No. 5,057,255 entitled "Molding Method and Molding Apparatus in an Injection-Compression Molding Machine", and U.S. Pat. No. 5,044,925 entitled "Injection-Compression Mold".

An example of a process control can be found in U.S. Pat. No. 4,146,601 entitled "Injection Mold Process Control".

Examples of hot runner or nozzle valves or shutters can be found in U.S. Pat. No. 5,078,589 entitled "Multicavity Injection Molding Apparatus having Precision Adjustment and Shut Off of Injection Flow to Individual Mold Cavities", U.S. Pat. No. 5,071,340 entitled "Cooling Arrangement for Valve Stem Gates in Hot Runner Injection Molding Machine Systems", and U.S. Pat. No. 5,067,893 entitled "Injection Molding Apparatus with Shut Off Valve Pin Actuation System".

Examples of a clamping apparatus can be found in U.S. Pat. No. 5,066,217 entitled "Clamping Apparatus for an Injection Molding Machine", U.S. Pat. No. 4,781,568 entitled "Mold Clamping Unit of Injection Molding Machine", and U.S. Pat. No. 4,545,756 entitled "Hydraulic Clamping Apparatus for an Injection Molding Machine".

Examples of a transport apparatus and gripper device can be found in U.S. Pat. No. 5,087,315 entitled "Fabric Lifting Apparatus and Method", U.S. Pat. No. 5,056,246 entitled "Device for Taking Trousers Off an Ironing Machine", U.S. Pat. No. 5,048,815 entitled "Gripper Device on Sheet-Feed Rotary Printing Machines", and U.S. Pat. No. 4,889,221 entitled "Vending Machine for Newspapers or Periodicals".

Some examples of latching shifters which may be used in accordance with the embodiments of the present invention, may be disclosed in the followin U.S. Patents: U.S. Pat. No. 5,421,219 entitled "Bicycle Speed Change System, Bicycle Speed Change Method and Bicycle Speed Change Operation Assembly" to Maeda and Bridgestone; No. 5,390,565 entitled "Bicycle Speed Change System, Bicycle Speed Change Method and Bicycle Speed Change Operation Assembly" to Maeda and Bridgestone; No. 5,315,891 entitled "Bicycle Speed Change Operation Assembly" to Maeda; and No. 5,241,877 entitled "Gear Selector" issued Sep. 7, 1993.

Some examples of latching shifters which may be used in accordance with the embodiments of the present invention, may be disclosed in the following Federal Republic of Germany Patents: No. DE 32 15 426 A1 to Fichtel & Sachs and No. DE 38 23 741 A1 to Shimano.

An additional example of latching shifters which may be used in accordance with the embodiments of the present invention, may be found in French Patent No. 2 540 818.

Some examples of twist grip shifters which may be used in accordance with the embodiments of the present invention, may be disclosed in the followin U.S. Patents: U.S. Pat. No. 3,218,879 entitled "Twist Grip Controls" to Raleigh; No. 5,134,897 entitled "Twist-grip Device for Operating the Gears of a Bicycle" to Campagnolo; No. 4,938,733 entitled "Bicycle Gear Shifting Method and Apparatus" to Sram Corporation; and No. 4,900,291 entitled "Bicycle Gear Shifting Method and Apparatus" to Sram Corporation.

Additional examples of twist grip shifters and related components which may be used in accordance with the embodiments of the present invention, may be disclosed in the following Federal Republic of Germany Patents: No. DE 32 15 427 A1 to Fichtel & Sachs and No. DE 37 27 933 A1.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A bicycle, said bicycle comprising:
    a frame;
    at least two wheels, said at least two wheels comprising at least a front wheel and a rear wheel;
    said at least two wheels being disposed on said frame;
    an arrangement to propel at least one of said front wheel and said rear wheel;
    said arrangement to propel comprising:
        a chain;
        at least two sprockets to engage said chain; and
        at least two pedals, said at least two pedals being connected to one of said at least two sprockets;
    a seat, said seat being disposed on said frame;
    a handlebar for steering said bicycle; and
    a bicycle gearing system, said bicycle gearing system comprising:
        an arrangement to shift gearing associated with at least one of: said front wheel and said rear wheel of said bicycle;
        a shift actuator mounted on said handlebar, generally coaxially with said handlebar;
        at least one control cable having a first end and a second end;
        said first end of said at least one control cable being operatively associated with said shift actuator;
        said second end of said at least one control cable being operatively associated with said arrangement to shift gearing; and
        said shift actuator comprising:
            a first part being rotatable in a first direction and a second direction;
            said first part being operatively connected to said arrangement to shift gearing;
            said first part comprising a rotatable grip part;
            a second part, said second part comprising an arrangement to actuate said first end of said at least one control cable;
            a housing, at least a portion of said second part being disposed within said housing;
            a connecting arrangement to connect said first part and said second part to one another, and for rotating said first part and said second part along with one another; and
            said connecting arrangement comprising:
                at least two projections disposed on one of said first part and said second part;
                at least two recesses disposed in the other one of said first part and said second part; and
                said at least two projections being engaged with said at least two recesses, one of said at least two projections being configured to solely engage with only one of said at least two recesses.

2. The bicycle according to claim 1 wherein:
    said at least two recesses are disposed in said first part; and
    said at least two projections are disposed on, and project generally radially from, said second part.

3. The bicycle according to claim 2 wherein:
    said at least two recesses comprise a plurality of recesses disposed in said first part;
    said at least two projections comprise a plurality of projections disposed on, and projecting generally radially from, said second part, one of said plurality of projections being configured to solely engage with only one of said plurality of recesses.

4. The bicycle according to claim 3 wherein:
    said housing comprises a first tubular extension being disposed about said handlebar and being disposed immediately adjacent said handlebar;
    said first part and said second part both being rotatable with respect to said first tubular extension of said housing;
    said second part comprises a cable-winding mechanism, said cable-winding mechanism comprising;
        a second tubular extension rotatably disposed about said first tubular extension, said second tubular extension having a first end disposed adjacent said first part and a second end disposed a substantial distance from said first end; and
        said plurality of projections being disposed circumferentially about said first end of said second tubular extension.

5. The bicycle according to claim 4 wherein: each of said plurality of projections comprises:
    a central, longitudinal axis defined perpendicular to the axis of rotation;
    a first side and a second side, both of said first side and said second side extending away from said second tubular extension and being angled towards one another and being angled towards the longitudinal axis;
    a third side extending between and adjoining said first and second sides;
    a back side facing towards said second end of said second tubular extension, said back side extending between said first and second sides and adjoining said third side, said back side being disposed perpendicularly with respect to the axis of rotation; and
    a front side disposed opposite said back side and facing towards said first part, said front side extending between said first and second sides and adjoining said third side, said front side extending away from said second tubular extension and being angled towards said back side;
    said first part has an interior portion and an exterior portion, said interior portion surrounding a portion of said first tubular extension of said housing and a substantial portion of said second tubular extension of said cable-winding mechanism;
    said plurality of recesses being disposed in said interior portion of said first part; and
    each of said plurality of recesses comprises:

a central, longitudinal axis defined perpendicular to the axis of rotation;

a first side and a second side, both of said first side and said second side of said recess extending into said interior portion and being angled towards one another and being angled towards the longitudinal axis of said recess;

a third side extending between and adjoining said first and second sides of said recess;

a back side extending between said first and second sides of said recess and adjoining said third side of said recess, said back side of said recess being angled towards the longitudinal axis of said recess;

said first, second and third sides of each of said recesses being disposed immediately adjacent said first, second and third sides of each of said projections, respectively; and said front side of each of said projections being disposed immediately adjacent said back side of each of said recesses.

6. The bicycle according to claim 5 wherein:

said one of said projections configured to solely engage with said one of said recesses comprises:

a base portion disposed immediately adjacent and along said second tubular extension;

a first stepped portion and a second stepped portion, said first stepped portion and said second stepped portion forming said base portion;

said first stepped portion extends in a circumferential direction away from said first side of said projection;

said first stepped portion comprising:
a first surface extending generally radially away from said second tubular extension and being angled towards the longitudinal axis of said projection, said first surface being substantially parallel to said first side of said projection;
a second surface extending from said first surface and adjoining said first side of said projection, said second surface being substantially parallel to said third side of said projection;

said second stepped portion extends in a circumferential direction away from said second side of said projection;

said second stepped portion comprising:
a first surface extending generally radially away from said second tubular extension and being angled towards the longitudinal axis of said projection, said first surface of said second stepped portion being substantially parallel to said second side of said projection; and
a second surface extending from said first surface of said second stepped portion and adjoining said second side of said projection, said second surface of said second stepped portion being substantially parallel to said third side of said projection;

said one of said recesses comprises:
a base portion disposed immediately adjacent said base portion of said one of said projections;
a first stepped portion and a second stepped portion, said first stepped portion and said second stepped portion of said one of said recesses together forming said base portion of said one of said recesses;
said first stepped portion of said one of said recesses extends in a circumferential direction away from said first side of said one of said recesses;
said first stepped portion of said one of said recesses comprising:
a first surface extending generally radially away from the axis of rotation and being angled towards the longitudinal axis of said one of said recesses, said first surface of said one of said recesses being substantially parallel to said first side of said one of said recesses; and
a second surface extending from said first surface of said one of said recesses and adjoining said first side of said one of said recesses, said second surface of said one of said recesses being substantially parallel to said third side of said one of said recesses;

said second stepped portion of said one of said recesses extends in a circumferential direction away from said second side of said one of said recesses;

said second stepped portion of said one of said recesses comprising:
a first surface extending generally radially away from the axis of rotation and being angled towards the longitudinal axis of said one of said recesses, said first surface of said one of said recesses being parallel to said second side of said one of said recesses; and
a second surface extending from said first surface of said one of said recesses and adjoining said second side of said one of said recesses, said second surface of said one of said recesses being substantially parallel to said third side of said one of said recesses; and said first stepped portion of said one of said projections being engaged within said first stepped portion of said one of said recesses, and said second stepped portion of said one of said projections being engaged with said second stepped portion of said one of said recesses.

7. The bicycle according to claim 6 wherein: said shift actuator further comprises:

an interior portion and an exterior portion, said second part being disposed within said interior portion of said shift actuator;

a sealing arrangement to seal said interior portion of said shift actuator, said sealing arrangement being disposed between said housing and said first part; and said sealing arrangement comprising:
a groove, said groove being circular and extending about the axis of rotation;
said groove being disposed in said first part;
a tongue, said tongue being circular and extending about the axis of rotation;
said tongue being disposed to extend a substantial distance within said groove;
said tongue being disposed on said housing; and
said tongue comprising one of the following sets of characteristics a) and b):
a) said tongue extends into said groove with a clearance to form a frictionless seal between said first part and said housing; and
b) said tongue contacts a portion of said first part to form a friction seal between said housing and said first part, said friction seal comprising a lip seal.

8. The bicycle according to claim 7 wherein:

said plurality of projections comprises four of said projections spaced at substantially equal distances from one another about said second tubular extension;

said plurality of recesses comprises four of said recesses spaced at substantially equal distances from one another within said interior portion of said first part;

said second tubular extension comprises:
- a disc-shaped member extending from said second end of said second tubular extension and extending generally radially with respect to the axis of rotation; and
- said disc-shaped member comprising said arrangement to actuate said first end of said at least one control cable, said arrangement to actuate comprising a guide member disposed on said disc-shaped member for guiding said at at least one control cable along a portion of said disc-shaped member;

said first part comprises:
- a substantially cylindrical part and a frusto-conical part disposed immediately adjacent one another and being integral with one another; and
- said cylindrical part having a hole disposed therethrough, said hole being disposed substantially concentrically about the axis of rotation; said frusto-conical part comprising said groove.

9. A handlebar mountable bicycle gear shifter, said gear shifter comprising:

a shift actuator being rotatably mounted on a handlebar, generally coaxially with the handlebar;

at least one control cable having a first end and a second end;

said first end of said at least one control cable being operatively associated with said shift actuator;

said second end of said at least one control cable for being operatively associated with gearing; and said shift actuator comprising:
- a first part being rotatable in a first direction and a second direction;
- said first part for being operatively connected to gearing;
- said first part comprising a rotatable grip part, said rotatable grip part having an axis of rotation;
- a second part, said second part comprising an arrangement to actuate said first end of said at least one control cable;
- a housing, at least a portion of said second part being disposed within said housing;
- a connecting arrangement to connect said first part and said second part to one another, and for rotating said first part and said second part along with one another; and
- said connecting arrangement comprising:
  - at least two projections disposed on one of said first part and said second part;
  - at least two recesses disposed in the other one of said first part and said second part; and
  - said at least two projections being engaged with said at least two recesses, one of said at least two projections being configured to solely engage with only one of said at least two recesses.

10. The gear shifter according to claim 9 wherein:

said at least two recesses are disposed in said first part; and said at least two projections are disposed on, and project generally radially from, said second part.

11. The gear shifter according to claim 10 wherein:

said at least two recesses comprise a plurality of recesses disposed in said first part;

said at least two projections comprise a plurality of projections disposed on, and projecting generally radially from, said second part, one of said plurality of projections being configured to solely engage with only one of said plurality of recesses.

12. The gear shifter according to claim 11 wherein:

said housing comprises a first tubular extension for being disposed about a handlebar and for being disposed immediately adjacent a handlebar;

said first part and said second part both being rotatable with respect to said first tubular extension of said housing;

said second part comprises a cable-winding mechanism, said cable-winding mechanism comprising;
- a second tubular extension rotatably disposed about said first tubular extension, said second tubular extension having a first end disposed adjacent said first part and a second end disposed a substantial distance from said first end; and
- said plurality of projections being disposed circumferentially about said first end of said second tubular extension.

13. The gear shifter according to claim 12 wherein: each of said plurality of projections comprises:
- a central, longitudinal axis defined perpendicular to the axis of rotation;
- a first side and a second side, both of said first side and said second side extending away from said second tubular extension and being angled towards one another and angled towards the longitudinal axis;
- a third side extending between and adjoining said first and second sides;
- a back side facing towards said second end of said second tubular extension, said back side extending between said first and second sides and adjoining said third side, said back side being disposed perpendicularly with respect to the axis of rotation; and
- a front side disposed opposite said back side and facing towards said first part, said front side extending between said first and second sides and adjoining said third side, said front side extending away from said second tubular extension and being angled towards said back side.

14. The gear shifter according to claim 13 wherein:

said first part has an interior portion and an exterior portion, said interior portion surrounding a portion of said first tubular extension of said housing and a substantial portion of said second tubular extension of said cable-winding mechanism; and said plurality of recesses being disposed in said interior portion of said first part;

each of said plurality of recesses comprises:
- a central, longitudinal axis defined perpendicular to the axis of rotation;
- a first side and a second side, both of said first side and said second side of said recess extending into said interior portion and being angled towards one another and angled towards the longitudinal axis of said recess;

a third side extending between and adjoining said first and second sides of said recess;

a back side extending between said first and second sides of said recess and adjoining said third side of said recess, said back side of said recess being angled towards the longitudinal axis of said recess;

said first, second and third sides of each of said recesses being disposed immediately adjacent said first, second and third sides of each of said projections, respectively; and said front side of each of said projections being disposed immediately adjacent said back side of each of said recesses.

15. The gear shifter according to claim 14 wherein:

said one of said projections configured to solely engage with said one of said recesses comprises:

a base portion disposed immediately adjacent and along said second tubular extension;

a first stepped portion and a second stepped portion, said first stepped portion and said second stepped portion together form said base portion;

said first stepped portion extends in a circumferential direction away from said first side of said projection;

said first stepped portion comprising:
  a first surface extending generally radially away from said second tubular extension and being angled towards the longitudinal axis of said projection, said first surface being substantially parallel to said first side of said projection;
  a second surface extending from said first surface and adjoining said first side of said projection, said second surface being substantially parallel to said third side of said projection;

said second stepped portion extends in a circumferential direction away from said second side of said projection;

said second stepped portion comprising:
  a first surface extending generally radially away from said second tubular extension and being angled towards the longitudinal axis of said projection, said first surface of said second stepped portion being substantially parallel to said second side of said projection; and
  a second surface extending from said first surface of said second stepped portion and adjoining said second side of said projection, said second surface of said second stepped portion being substantially parallel to said third side of said projection.

16. The gear shifter according to claim 15 wherein:

said one of said recesses comprises:

a base portion disposed immediately adjacent said base portion of said one of said projections;

a first stepped portion and a second stepped portion, said first stepped portion and said second stepped portion of said one of said recesses together forming said base portion of said one of said recesses;

said first stepped portion of said one of said recesses extends in a circumferential direction away from said first side of said one of said recesses;

said first stepped portion of said one of said recesses comprising:
  a first surface extending generally radially away from the axis of rotation and being angled towards the longitudinal axis of said one of said recesses, said first surface of said one of said recesses being substantially parallel to said first side of said one of said recesses;
  a second surface extending from said first surface of said one of said recesses and adjoining said first side of said one of said recesses, said second surface of said one of said recesses being substantially parallel to said third side of said one of said recesses;

said second stepped portion of said one of said recesses extends in a circumferential direction away from said second side of said one of said recesses;

said second stepped portion of said one of said recesses comprising:
  a first surface extending generally radially away from the axis of rotation and being angled towards the longitudinal axis of said one of said recesses, said first surface of said one of said recesses being substantially parallel to said second side of said one of said recesses;
  a second surface extending from said first surface of said one of said recesses and adjoining said second side of said one of said recesses, said second surface of said one of said recesses being substantially parallel to said third side of said one of said recesses; and said first stepped portion of said one of said projections being engaged within said first stepped portion of said one of said recesses, and said second stepped portion of said one of said projections being engaged with said second stepped portion of said one of said recesses.

17. The gear shifter according to claim 16 wherein:

said shift actuator further comprises:

an interior portion and an exterior portion, said second part being disposed within said interior portion of said shift actuator;

a sealing arrangement to seal said interior portion of said shift actuator, said sealing arrangement being disposed between said housing and said first part; and said sealing arrangement comprising:
  a groove, said groove being circular and extending about the axis of rotation;
  said groove being disposed in said first part;
  a tongue, said tongue being circular and extending about the axis of rotation;
  said tongue being disposed to extend a substantial distance within said groove;
  said tongue being disposed on said housing; and
  said tongue comprising one of the following sets of characteristics a) and b):
    a) said tongue extends in to said groove with a clearance to form a frictionless seal between said first part and said housing; and
    b) said tongue contacts a portion of said first part to form a friction seal between said housing and said first part, said friction seal comprising a lip seal.

18. The gear shifter according to claim 17 wherein:

said plurality of projections comprises four of said projections spaced at substantially equal distances from one another about said second tubular extension;

said plurality of recesses comprises four of said recesses spaced at substantially equal distances from one another circumferentially within said interior portion of said first part;

said second tubular extension comprises:
  a disc-shaped member extending from said second end of said second tubular extension and extending generally radially with respect to the axis of rotation; and
  said disc-shaped member comprising said arrangement to actuate said first end of said at least one control cable, said arrangement to actuate comprising a guide member disposed on said disc-shaped member for guiding said at at least one control cable along a portion of said disc-shaped member;

said first part comprises:
  a substantially cylindrical part and a frusto-conical part disposed immediately adjacent one another and being integral with one another; and
  said cylindrical part having a hole disposed therethrough, said hole being disposed substantially concentrically about the axis of rotation; and
said frusto-conical part comprising said groove.

* * * * *

UNITED STATES PATENT AND TRADEMARK OFFICE
CERTIFICATE OF CORRECTION

PATENT NO. : 5,823,058
DATED : October 20, 1998
INVENTOR(S) : Markus ARBEITER

It is certified that error appears in the above-identified patent and that said Letters Patent is hereby corrected as shown below:

In column 13, line 56, after 'the', delete "followin" and insert --following--.

In column 14, line 3, after 'the', delete "followin" and insert --following--.

In column 14, line 16, after 'the', delete "followin" and insert --following--.

In column 14, line 23, after 'the', delete "followin" and insert --following--.

In column 16, line 23, after 'the', delete "followin" and insert --following--.

In column 16, line 44, after 'the', delete "followin" and insert --following--.

Signed and Sealed this

Seventh Day of September, 1999

Attest:

Q. TODD DICKINSON

Attesting Officer        Acting Commissioner of Patents and Trademarks